US012803607B2

(12) United States Patent
Jaklitsch

(10) Patent No.: US 12,803,607 B2
(45) Date of Patent: Nov. 17, 2026

(54) SIMULATION SYSTEM WITH EMULATION OF RECEIVER EFFECT ON BAND-ADJACENT SIGNALS

(71) Applicant: Textron Systems Coporation, Hunt Valley, MD (US)

(72) Inventor: James Joseph Jaklitsch, Parkton, MD (US)

(73) Assignee: Textron Systems Corporation, Hunt Valley, MD (US)

( * ) Notice: Subject to any disclaimer, the term of this patent is extended or adjusted under 35 U.S.C. 154(b) by 52 days.

(21) Appl. No.: 19/092,435

(22) Filed: Mar. 27, 2025

(65) Prior Publication Data

US 2025/0309932 A1 Oct. 2, 2025

Related U.S. Application Data

(60) Provisional application No. 63/571,105, filed on Mar. 28, 2024.

(51) Int. Cl.
*H04B 1/10* (2006.01)
*H04L 25/03* (2006.01)

(52) U.S. Cl.
CPC ............... *H04B 1/10* (2013.01); *H04L 25/03* (2013.01)

(58) Field of Classification Search
CPC ........ H04B 1/10; H04B 17/3912; H04L 25/03
USPC .................................................. 375/340, 350
See application file for complete search history.

(56) References Cited

U.S. PATENT DOCUMENTS

| | | |
|---|---|---|
| 7,436,911 B2 | 10/2008 | Fudge et al. |
| 7,593,459 B1 | 9/2009 | Venkatesh et al. |
| 7,773,967 B2 | 8/2010 | Smith |
| 8,401,108 B1 | 3/2013 | Haddadin et al. |
| 8,427,366 B2 | 4/2013 | Ganeshan et al. |
| 8,855,254 B2 | 10/2014 | Poklemba et al. |
| 8,953,715 B1 | 2/2015 | Haddadin et al. |
| 9,077,316 B2 | 7/2015 | Frei et al. |
| 9,362,979 B2 | 6/2016 | Chivers et al. |
| 9,614,629 B2 | 4/2017 | Braz et al. |
| 9,621,175 B2 | 4/2017 | Pagnanelli |

(Continued)

FOREIGN PATENT DOCUMENTS

CN 113162641 A 7/2021

OTHER PUBLICATIONS

International Search Report and Written Opinion for application No. PCT/US2025/021776, dated Jul. 3, 2025, pp. 10.

*Primary Examiner* — Emmanuel Bayard
(74) *Attorney, Agent, or Firm* — BainwoodHuang

(57) ABSTRACT

A computerized simulation system includes a digital receiver emulator that applies over-sampling and multiplexing to in-phase and quadrature (I-Q) data streams to create a composite I-Q signal stream that represents a signal environment in a bandwidth wider than that of an assumed digital receiver bandwidth, applying a band-limiting filter to reduce the signal bandwidth so as to match the digital receiver bandwidth, and decimating the I-Q signal to match the data rate of the simulated digital receiver. The digital receiver can accurately emulate effects of band-adjacent signals that may be adjacent or overlap with the receiver passband, considering the characteristics of low-pass filters used in real-world receivers. The simulation system may be part of a training system that presents a simulated signal environment to a trainee.

20 Claims, 20 Drawing Sheets

(56) References Cited

U.S. PATENT DOCUMENTS

| | | | | |
|---|---|---|---|---|
| 9,820,716 | B2 * | 11/2017 | Baba | G01S 7/52066 |
| 11,050,591 | B2 * | 6/2021 | Nikitin | H03M 3/344 |
| 12,119,853 | B2 * | 10/2024 | Wang | H04B 1/10 |
| 2006/0111074 | A1 | 5/2006 | Petilli et al. | |
| 2007/0025430 | A1 * | 2/2007 | Rasmussen | H04L 27/2275<br>375/150 |
| 2009/0068974 | A1 * | 3/2009 | Smith | H04B 1/30<br>455/304 |
| 2017/0257125 | A1 | 9/2017 | Das et al. | |
| 2023/0308107 | A1 | 9/2023 | Mcgibney et al. | |

* cited by examiner

SIMULATION SYSTEM WITH EMULATION OF RECEIVER EFFECT ON BAND-ADJACENT SIGNALS

BACKGROUND

This invention is in the field of simulation of systems operating on electromagnetic signals, and it relates more specifically to emulation of digital receiver pass-band limits in a simulated dense signal environment represented by a set of In-phase/Quadrature (I-Q) data streams.

SUMMARY

A disclosed technique applies over-sampling and multiplexing to I-Q data streams to create a composite I-Q signal stream that represents a signal environment in a bandwidth wider than that of an assumed digital receiver bandwidth, applying a band-limiting filter to reduce the signal bandwidth so as to match the digital receiver bandwidth, and decimating the I-Q signal to match the data rate of the simulated digital receiver. A benefit is an ability to accurately emulate effects of signals that may be adjacent or overlap with the receiver passband, considering the characteristics of low-pass filters used in real-world receivers. The technique may be used in a simulation system (e.g., trainer) that presents a modeled signal environment to a trainee, for example.

BRIEF DESCRIPTION OF THE DRAWINGS

The foregoing and other objects, features and advantages will be apparent from the following description of embodiments of the invention, as illustrated in the accompanying drawings in which reference characters refer to the same parts throughout the different views.

DETAILED DESCRIPTION

Overview

Figure 1:
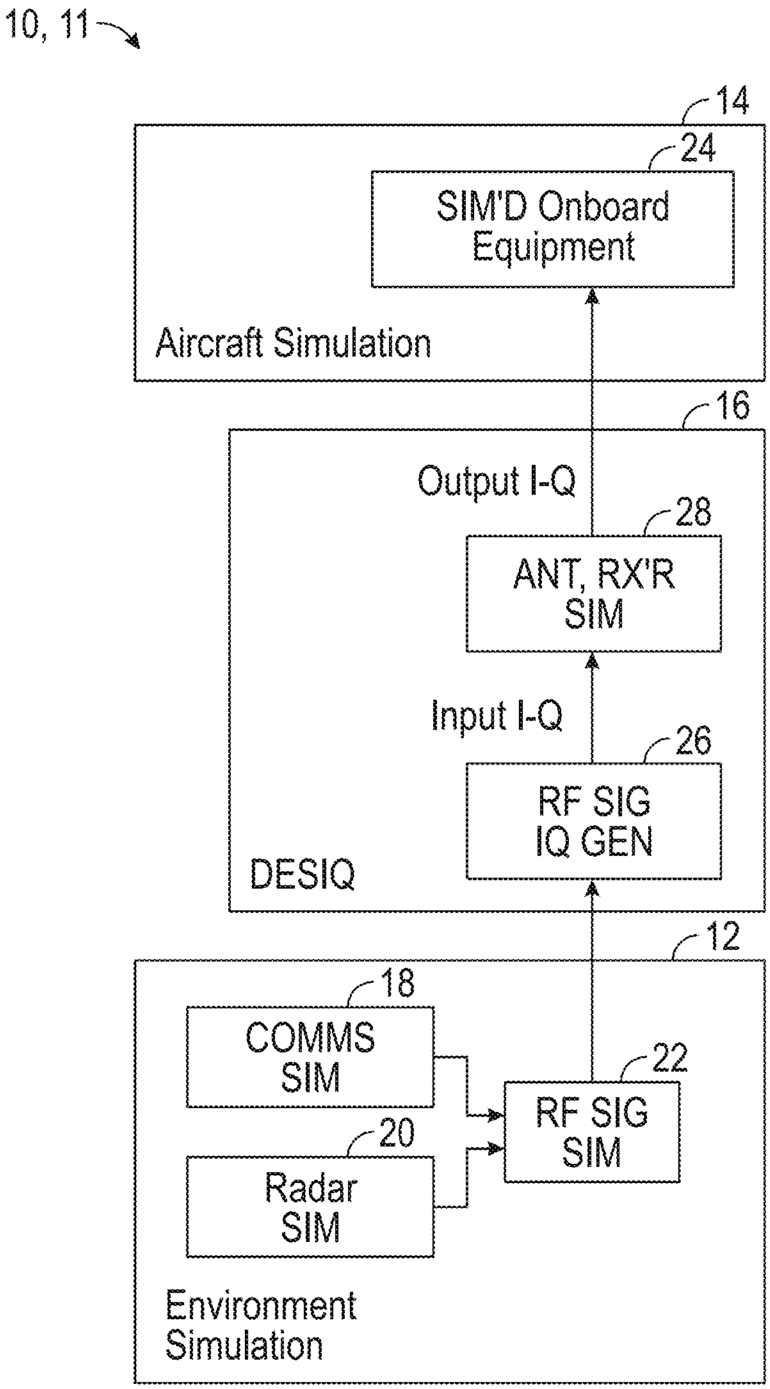
FIG. 1 is a functional block diagram of a simulation system (platform)

Described herein is a technique for emulating the operational performance of a digital receiver in a dense signal environment. In a common use, a digital receiver is tunable across a wide range of frequencies, has a finite bandwidth, and generates a stream of I-Q data samples at a specified sample rate, in units of Millions of Samples Per Second (MSPS).

A receiver emulation may be part of a Dynamic Enhanced Streaming I-Q (DESIQ) capability of a simulation system or platform. The DESIQ capability generally includes both the generation and injection of emitter I-Q data streams, as well as the emulation of tunable digital receivers. The first aspect (generation and injection of emitter I-Q data streams) deals with generating real-time I-Q streams (from bitstream data and modulation parameters) that represent individual emitters in a simulation. The second aspect (emulation of tunable receivers) deals with emulating a digital receiver of finite bandwidth, producing a single I-Q data stream that is the summation of all emitters in the receiver passband as well as those that are band-adjacent, i.e., residing at least partially in a transition or gap region just outside the edge of the passband. The present description is directed primarily to the emulation of tunable digital receivers.

A digitizing receiver produces a single I-Q data stream that represents the summation of all signals within the receiver passband. Because the signals exist at defined frequencies within the environment, and the receiver is tunable across a wide range of frequencies, exactly what signals fall within the receiver passband is dependent upon where the receiver is tuned. This leads to several cases, some of which may be difficult to accurately simulate employing conventional baseband-level digital signal processing.

In a first case, there is a clean break between signals that fall within the receiver passband and other signals that fall outside of it. In this case, there are no band-adjacent signals straddling the receiver passband edges. In an example herein, the receiver bandwidth is 80 to 100 MHz (i.e., ±40 MHz to ±50 MHz with respect to the receiver tuning frequency). This case corresponds to having all signals either completely within the receiver passband or completely outside of it (e.g., signals centered above about 50 MHz in a system having a receiver bandwidth of ±40 MHz.

In a second case, there are band-adjacent signals straddling the edges of the receiver passband. In this case, most of the signals are either fully inside or outside the receiver passband, but some signals on either side are straddling the passband edges. In this case, the receiver emulation must capture the signals that are fully within the receiver Bandwidth, and the portions of the straddling signals that fall within the passband, but it must reject the portions that fall outside the passband. In other words, the emulation must render appropriately distorted versions of any band-adjacent signal that straddles the edges of the receiver passband.

Finally, in a third case a very wideband signal straddles the entire receiver bandwidth including the band-adjacent regions. In this case, the receiver emulation must capture the signal content that falls within the receiver bandwidth but must reject the portions that fall outside of it.

In addition to implementing the above functionality, it may also be desirable to provide for economical scaling-up of DESIQ capability, e.g., to maximize the number of digital receivers that can be emulated in a simulation system, with each emulation using a desirably large number of signal (e.g., 128 in one example). Thus it may be an objective to realize some number (e.g., four or more) of independent digital receivers in a high-end Field Programmable Gate Array (FPGA) card or Graphics Processing Unit (GPU), wherein each of those digital receivers can support the desired number (e.g., 128) of emulated signals, of various bandwidths, within or straddling the receiver passbands. This economic and performance consideration can be reflected in certain aspects of the emulation technique to make efficient use of hardware resources, as described below.

Embodiments

FIG. 1 is a functional block diagram of an simulation platform 10 that provides simulated operation of communications equipment in a contested electromagnetic signal environment, i.e., one in which there may be a variety of sources of communications signals that coexist with (and may interfere with, either intentionally or not) desired communications signal(s). As an example, the simulation platform 10 can be used to train communications personnel to effectively operate communications equipment to identify and mitigate interfering signals such as jamming signals generated by parties intentionally jamming communications signals to reduce the ability to communicate effectively. In some embodiments, the simulation platform 10 may be used to simulate so-called electromagnetic spectrum operations (ESO), also sometimes referred to as electronic warfare.

The simulation platform 10 is a computer-implemented platform executing a variety of software modules to realize a functional organization 11 of various functional components as shown, including an environment simulation 12, aircraft simulation 14, and a digital receiver emulator shown as DESIQ 16 ("Dynamic Enhanced Streaming I-Q", where I-Q refers to in-phase and quadrature signal components as generally known in the art). As shown, the environment simulation 12 includes respective simulations for communications (COMMS SIM 18), radar (RADAR SIM 20) and RF signal (RF SIG SIM 22). The aircraft simulation 14 includes simulation(s) 24 for onboard equipment, e.g., communications terminal equipment, ESO equipment, etc. The receiver emulator (DESIQ) 16 includes an RF signal IQ generator (RF SIG IQ GEN) 26 and antenna and receiver simulations (ANT, RX'R SIM) 28. In the present description, the receiver emulator is functionality contained within the antenna and receiver simulations 28.

In operation, the environment simulation 12 generates a set of simulated RF signals corresponding to the kind of real-world signals produced and received in a real operating environment, e.g., during flight of an aircraft in an area having various emitters of communications signals and radar signals. The receiver emulator 16 is responsible for emulating operation of a digital receiver on this set of simulated RF signals and for generating a composite, baseband signal OUTPUT I-Q representing demodulation of the simulated RF signals. The aircraft simulation 14 then simulates the operation of terminal-type equipment on these baseband signals, for purposes such as training, evaluation, product, or process development, etc. The present description is focused on the structure and functionality of the receiver emulator 16, being a critical component in a simulation platform such as platform 10. Even more particularly, the description is directed to the channel-level receiver emulation that is part of the antenna and receiver simulation 28, which operates on a set of channel I-Q signals (INPUT I-Q) to produce the output baseband signal OUTPUT I-Q. References herein to the "receiver simulation" or "receiver emulation" (with or without use of reference 28) should be understood as references to the receiver emulator portion of the antenna and receiver simulation 28.

Figure 2:
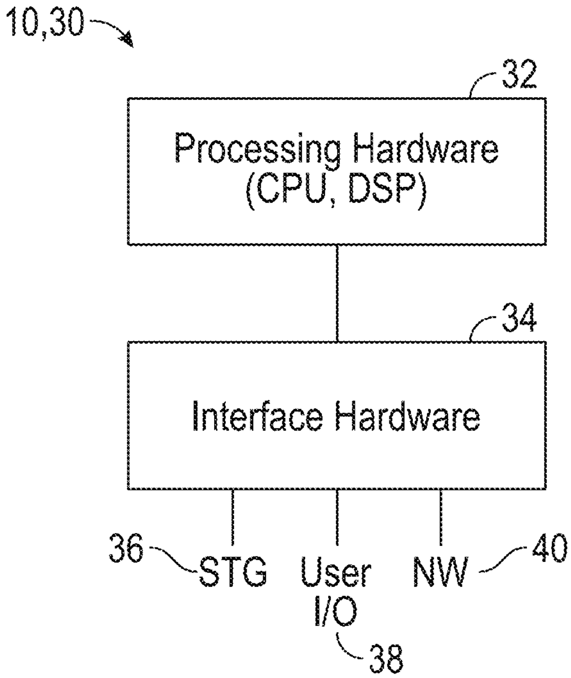
FIG. 2 is a hardware block diagram of a computerized hardware platform for executing software to realize the simulation system of FIG. 1.

FIG. 2 illustrates a hardware-level organization 30 of the simulation platform 10 in one embodiment. It includes processing hardware 32 generally including one or more general-purpose CPUs as well as a collection of more specialized digital signal processing (DSP) circuitry, all programmed (i.e., executing computer program instructions) to operate according to the functional organization 11 of FIG. 1. The hardware organization 30 also includes interface hardware 34 providing data interface(s) between the processing hardware 32 and other system components, including for example local data storage (STG) 36, local user input/output (USER I/O) 38 (such as display, keyboard, etc.), and a data network (NW) 40 that interconnects the platform 10 to other computerized equipment. As generally known, the computer program instructions are typically stored on a non-volatile computer-readable medium such as a magnetic disk, non-volatile semiconductor memory (e.g., Flash memory), etc.

The DSP circuitry of processing hardware 32 may be realized in a variety of ways, as generally known. In one embodiment it is realized using customized field-programmable gate array (FPGA) logic. Mention of FPGAs herein may be understood more generally as references to hardware units of DSP processing. In some systems it is desired to emulate many digital receivers in a desirably compact hardware arrangement, and thus there is description below of various considerations at the processing level that may affect hardware requirements and thus hardware efficiency/scalability etc.

Figure 3:
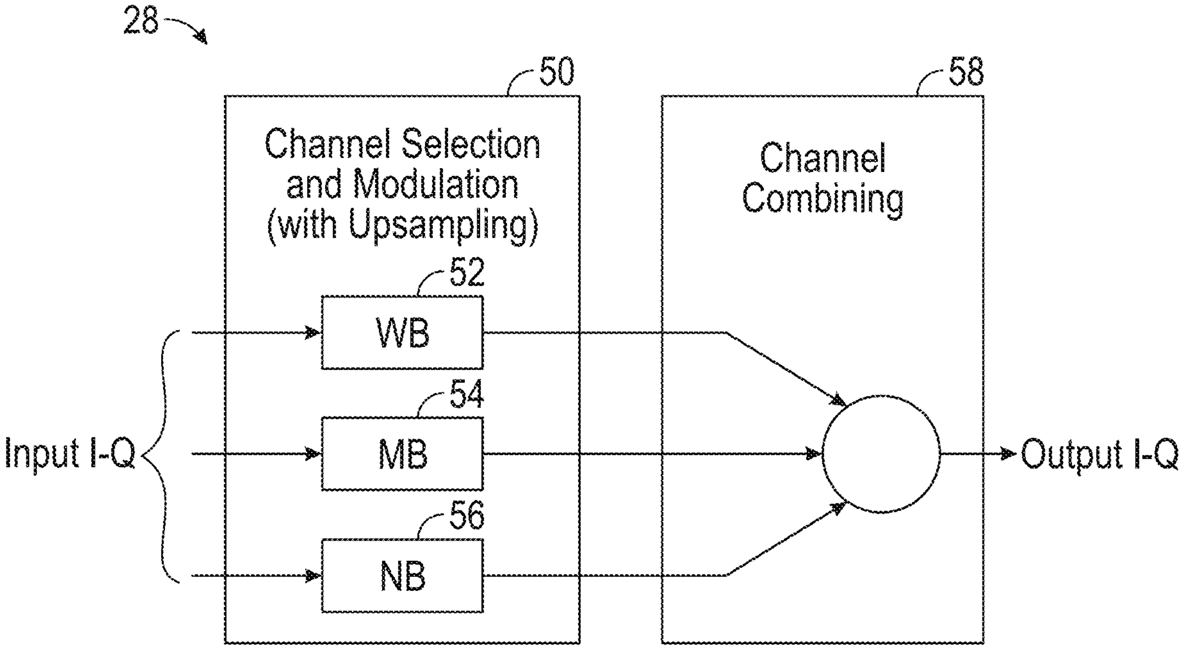
FIG. 3 is a functional block diagram of a digital receiver emulator in the simulation system.

FIG. 3 shows the general structure of the receiver emulation 28. It includes first logic 50 for channel selection and modulation, including up sampling, as described below. The logic 50 includes respective sets of functional blocks 52 for wideband (WB) channels, functional blocks 54 for medium-band (MB) channels, and functional blocks 56 for narrow-band (NB) channels. Channel combining logic 58 combines the channels and applies further processing (filtering and down-sampling) to create the single output data stream OUTPUT I-Q carrying all input channels in designated spectral locations. Details of these functional blocks 50-58 are described further below.

Received Signal Characteristics

As noted above, a digitizing receiver emulator 28 produces a single I-Q data stream OUTPUT I-Q that represents the summation of all signals (including parts or wholes of interfering signals) within a receiver passband. Because the signals exist at defined frequencies within the environment, and the receiver is tunable across a range of frequencies, exactly which signals fall within the receiver passband is dependent upon where the receiver is tuned. This leads to several cases, as illustrated in FIGS. 4 through 6.

Figure 4:
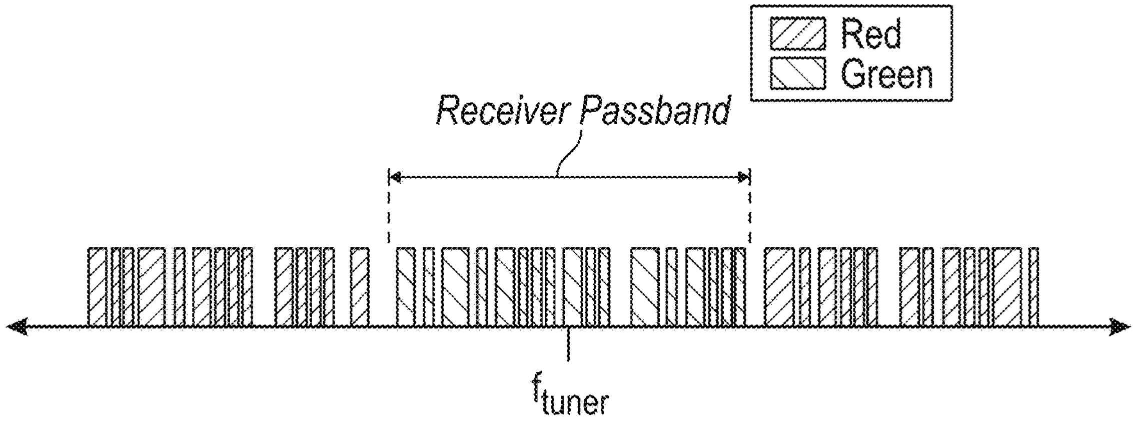
FIGS. 4-6 are frequency-spectrum diagrams of signal environments.

FIG. 4 illustrates a first case in which there is a clean break between signals that fall within the receiver passband (labeled "Green") and those that fall outside ("Red"). In this case, there are no signals straddling the receiver passband edges. In one example, the receiver bandwidth is 80 to 100 MHz (i.e., ±40 MHz to ±50 MHz with respect to the receiver tuning frequency).

Figure 5:
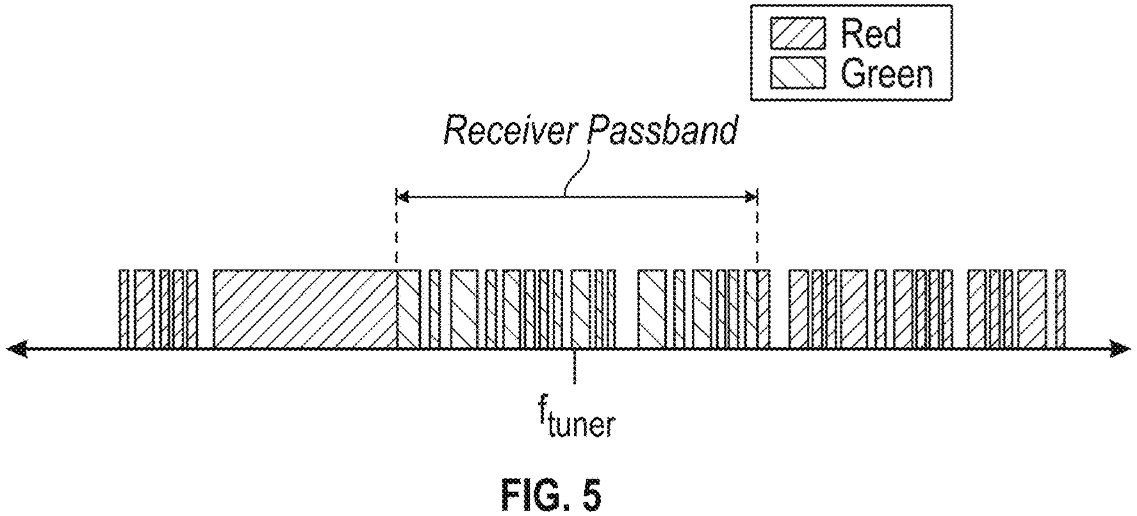

FIG. 5 illustrates a second case in which there are "band-adjacent" signals (Red) that include signal straddling the edges of the receiver passband. In this case, most of the signals are either fully inside (Green) or outside (Red) the receiver passband, but discrete signals on either side are straddling the passband edges. In this case, the receiver emulation must capture the signals that are fully within the receiver bandwidth, as well as the portions (Green) of the straddling signals that fall within the passband, and reject the portions (Red) that fall outside the passband. In other words, the receiver emulation 28 must render appropriately distorted versions of any signal that straddles the edges of the receiver passband.

Figure 6:
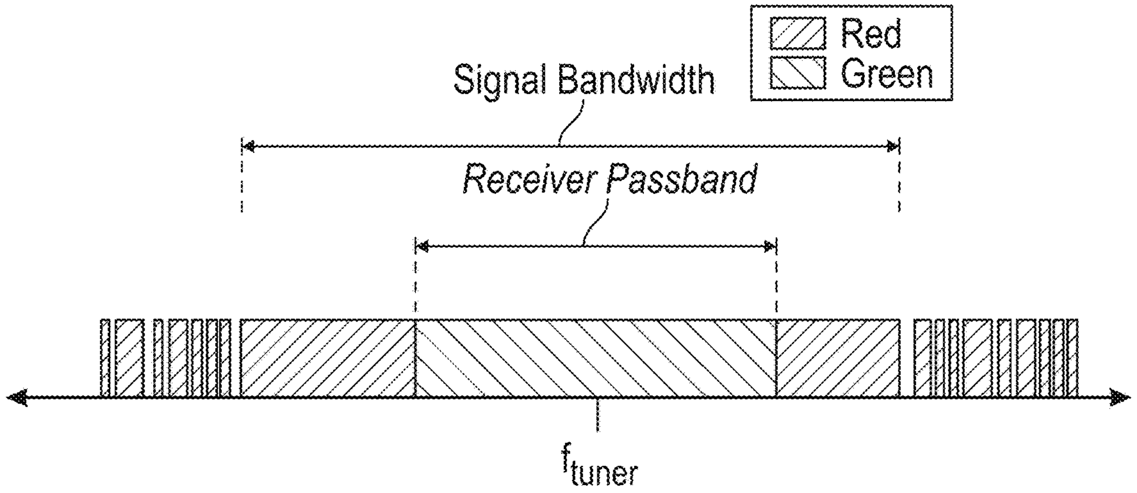

FIG. 6 illustrates a third case in which a very wideband signal completely envelopes the entire receiver passband. In this case, the receiver emulation 28 must capture the signal content (Green) that falls within the receiver passband and reject the band-adjacent portions (Red) that fall outside of it.

Sampled Data Rates

The choice of sampling frequency is an important consideration in a Digital Signal Processing (DSP) implementation. In general, it is desired to use the lowest sampling frequency that will not cause aliasing, because of the desire to scale a design as noted above (e.g., four digital receivers, each with up to 128 signal channels). Higher sample rates than strictly necessary use more logic resources and on-board memory, working against scalability objectives.

Figure 7:
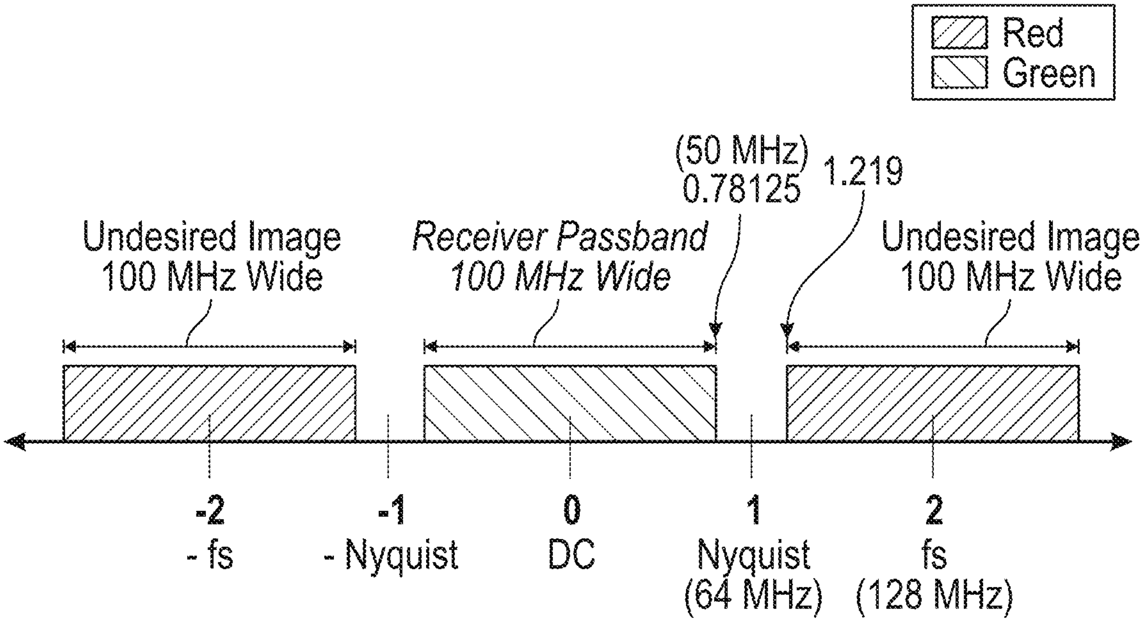
FIGS. 7-9 are frequency-spectrum diagrams showing images of receiver passband and a band-adjacent signal in nominal and up-sampled processing environments.
Figure 8:
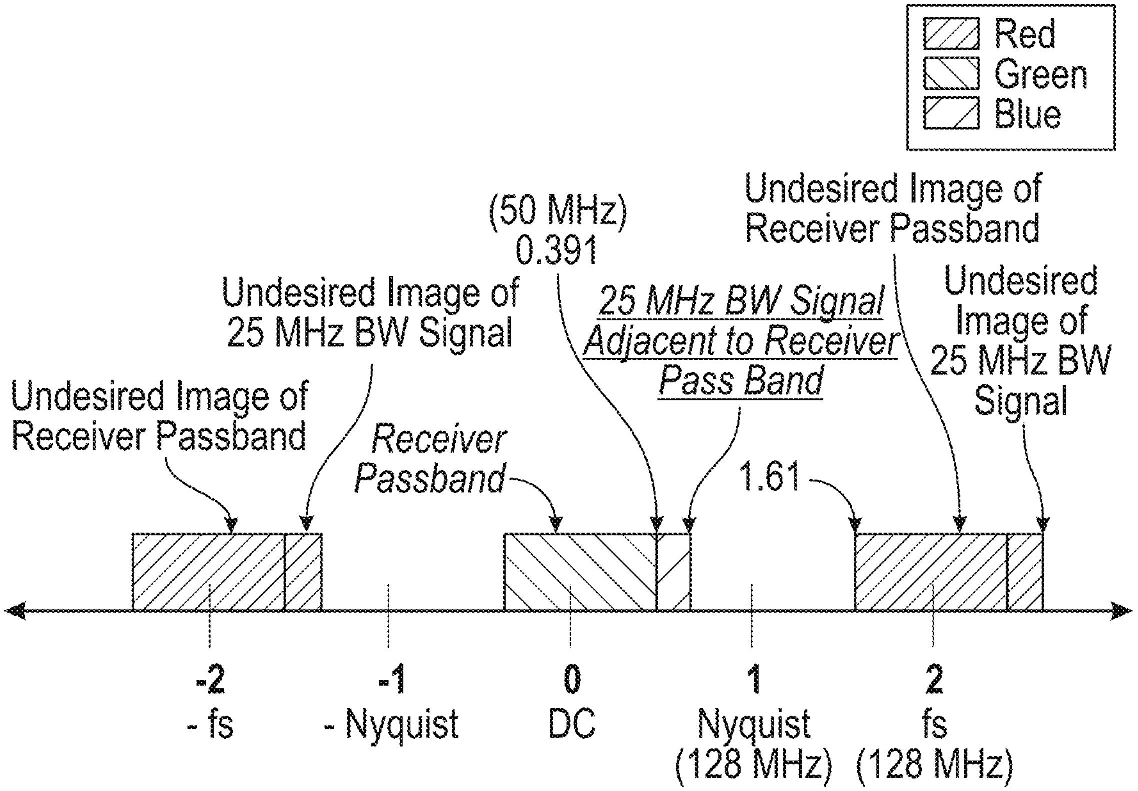
Figure 9:
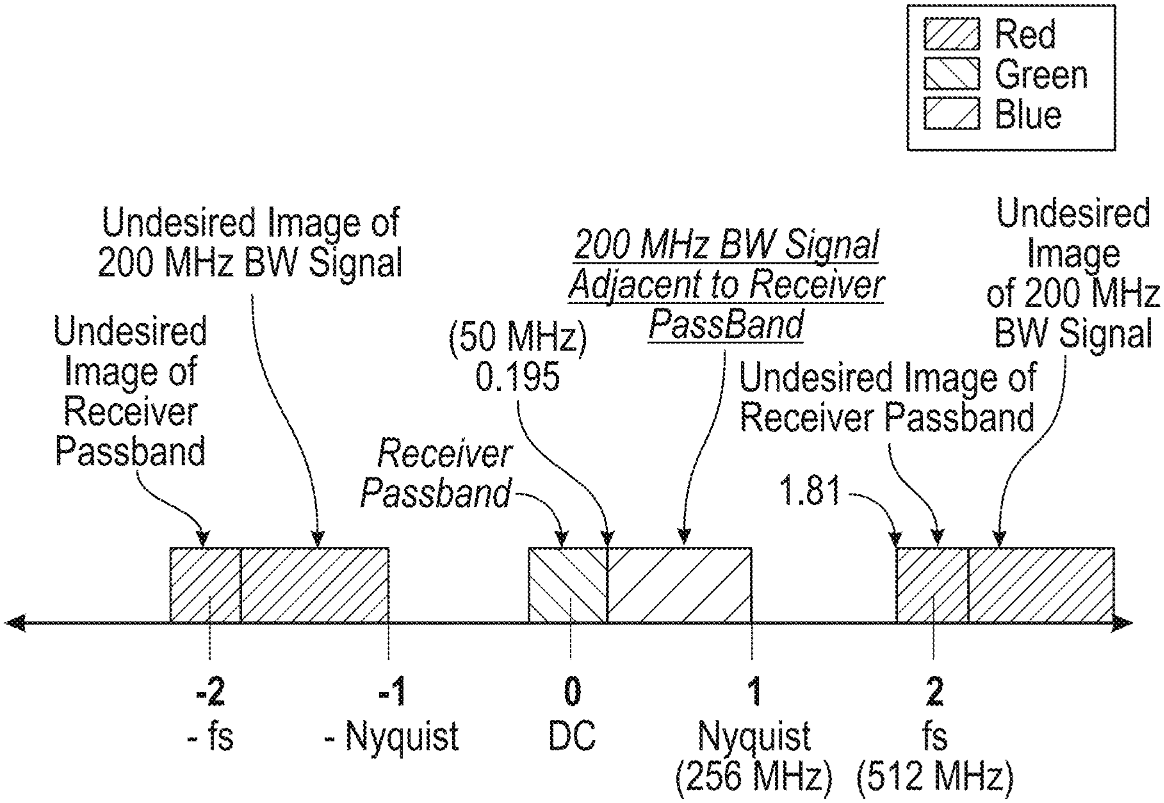

FIGS. 7-9 are diagrams used to describe considerations and selection of sampled data rates for receiver emulation in one embodiment.

FIG. 7 illustrates spectral fill characteristics of an example digital receiver to be emulated, having a maximum bandwidth of 100 MHz and an output sampled data rate of 128 MSPS. FIG. 7 uses a normalized frequency scale in which 1 is the so-called "Nyquist" frequency and 2 is the sampling frequency $f_s$. In I-Q sampled-data space, the desired passband extends to either side of DC (e.g., ±50 MHz), while the sampling process generates an undesired image at every multiple (positive and negative) of the sampling frequency.

The arrangement of FIG. 7 yields 78.125% spectral fill, with gaps around the Nyquist frequency as shown. If the desired passband were permitted to touch the Nyquist frequency, the signal would be consuming 100% of the available spectrum and be touching its undesired image. In practice, 100% fill is never permitted to occur because a real filter is required to pass the desired signal and reject the images. Practical filter implementations do not have perfectly vertical transitions at their passband edges, so the gaps allow for more gradual filter roll-off of real filters in these regions.

As an example, for digital Finite Impulse Response (FIR) filters, sharper transitions require more coefficients, thereby sharply driving higher complexity in implementation. For this reason, 80% utilization (spectral fill) may provide an acceptable tradeoff between efficient spectral utilization and the acceptable complexity of the required FIR filter. Thus, in the illustrated example, a sample rate of 128 MSPS provides for a receiver passband (±50 MHz) that consumes 78.125% of the available spectrum, and the receiver being emulated is well optimized for its own mission (i.e., digitize signals within a ±50 MHz passband). Such a sample rate as in FIG. 7 may be termed a "nominal" or "base" sampling rate, as it is a lowest practical sampling rate that satisfies the Nyquist criteria for the receiver bandwidth with a practical maximum spectral fill, such as on the order of 80% in this example (more generally, in a range above about 75%).

For emulating receiver operation in a real environment containing other emitters, it is necessary to consider the possibility of other signals that may extend partially outside of the receiver passband, and how to ensure that such signals (termed "band-adjacent" and/or "interfering signals" herein) are accurately captured and represented. This problem, and the use of hyper-sampling to address it, is illustrated in FIGS. 8 and 9 which are discussed below.

To obtain sufficient bandwidth to handle interfering signals adjacent to, or partially straddling, the receiver passband, the receiver emulation is executed in a hyper-sampled environment of 2× or 4× the nominal receiver sample rate (which is 128 MSPS in the present example, as described above with reference to FIG. 7). In the hyper-sampled environment, multiple signals may be placed within the receiver passband or straddling the edges of the passband (i.e., superimposed I-Q data streams, with aggregate bandwidth wider than the receiver passband). The receiver measurement response is computed by filtering the superimposed, hyper-sampled I-Q data streams to match the bandwidth of the receiver passband. Once the combined I-Q data streams have been filtered, the additional bandwidth afforded by hyper-sampling is no longer required, so the sampling rate is reduced by decimation/down-sampling back to the nominal rate (e.g., 128 MSPS) of the receiver output.

FIGS. 8 and 9 illustrate spectral utilization for two different hyper-sampling sample rates in this example, fs=256 MSPS (2×) and fs=512 MSPS (4×) respectively. These are described in turn.

FIG. 8 illustrates how the sampled data spectrum changes when the sampling frequency is doubled from 128 MSPS (receiver hardware sampling rate) to 256 MSPS (2× nominal). The ±50 MHz receiver passband that consumes 78.125% of the available spectrum in FIG. 7 is reduced to 39.1% of the available spectrum. This opens space to be able to place moderate bandwidth "band-adjacent" signals ("Blue") adjacent to or partially overlapping the receiver passband without causing aliasing. By using Single-Sideband (SSB) modulation (such as described below) a signal can be placed to either side of the receiver passband, including straddling either band edge. It is also possible to place one signal on the lower band edge and another on the upper band edge, with differing amounts of intrusion into the passband.

In FIG. 8 the 25 MHz BW Blue signal is a signal that started as ±12.5 MHz at baseband (i.e., centered about zero), also with undesired images at every multiple of the sampling frequency. That baseband signal is then moved to a center frequency of 62.5 MHz (to just touch the edge of the receiver passband) by SSB modulating it with a 62.5 MHz digital local oscillator (which shifts the desired signal and all undesired images to the right by 62.5 MHz), then adding the result into the composite spectrum. Because the composite spectrum is now the summation of an unshifted frequency band (Green receiver passband) and a positive-shifted signal (Blue 25 MHz wide signal at 62.5 MHz), the composite spectrum is not symmetrical about DC.

The example illustrated in FIG. 8 has an effective spectral fill of 48.8% ([25/128+100/128]/2). It shows that a sample rate of 256 MSPS is sufficient to emulate the effect of straddling signals with bandwidth up to about 25 MHz in this example.

FIG. 9 illustrates the effect of increasing the receiver emulation sampled data rate to 512 MSPS (4× nominal). The upper edge of the receiver passband is at 0.195, while the closest image is at 1.81. This provides the spectral open space (gap) necessary to include very wideband signals of up to 200 MHz BW for example. As with the prior example, the straddling (band-adjacent) signal (Blue) may be placed to either side of the receiver passband (or set to fully overlap both ends). This example has an effective spectral fill of 58.6% ([(2×50)/256+200/256]/2). It shows that a sample rate of 512 MSPS is sufficient to emulate the effect of straddling signals of up to 200 MHz BW.

It should be noted that FIGS. 8 and 9 depict the situation for only a single interfering signal. The actual spectral pattern generated by the receiver emulator 28 is generally much more crowded and complex, carrying many channels of varying bandwidth, as described more below.

Referring again to FIGS. 1 and 3, it is generally desired to emulate environments having many emitters that may be generating signals of different types. Thus, the receiver emulator 28 operates upon a collection of input signals INPUT I-Q that reflect such scale and diversity. As already noted, three different channel types are supported (wideband, medium-band, and narrowband), and within each type corresponding overall numbers are supported corresponding to potential real-world conditions to be simulated. Many communications signals are typically narrowband, but there are wideband exceptions. For this reason, it is desired to provide flexibility (i.e., an ability to reconfigure) with respect to channel bandwidth. An example implementation described herein has four (4) wideband channels (e.g., 200 MHz max), six (6) medium-band channels (e.g., 25 MHz max) and one hundred eighteen (118) narrowband channels (e.g., 5 MHz max). Those skilled in the art will appreciate that there are numerous other sets of channel structures and characteristics that alternative implementations may be based on.

Table 1 below lists sampled data rates for respective channel bandwidths. These are hardware sampled data rates (i.e., binary relation to the 128 MSPS receiver sample data rate). User-Defined signals may be specified at any (Unaliased) sampled data rate, but need to be re-sampled, prior to run-time, to the lowest hardware sampled data rate that will prevent aliasing. The re-sampling operation is automated in the signal definition software.

TABLE 1

Bandwidth (BW) Options and Sample Data Rates

| BW Option | I-Q Data Rate |
|---|---|
| 25 KHz | 31.25 KSPS |
| 200 KHz | 250 KSPS |
| 800 KHz | 1 MSPS |
| 2.5 MHz | 4 MSPS |
| 5 MHz | 8 MSPS |
| 10 MHz | 16 MSPS |
| 25 MHz | 32 MSPS |
| 40 MHz | 64 MSPS |
| 80 MHz | 128 MSPS |
| 200 MHz | 256 MSPS |

Digital Signal Processing Elements

Throughout the signal processing chain, each signal has its I-Q Modulation data Single-Sideband (SSB) modulated onto a carrier that shifts the signal to a specified spectral location (±δf) with respect to the center frequency of the DESIQ receiver.

Figure 10:
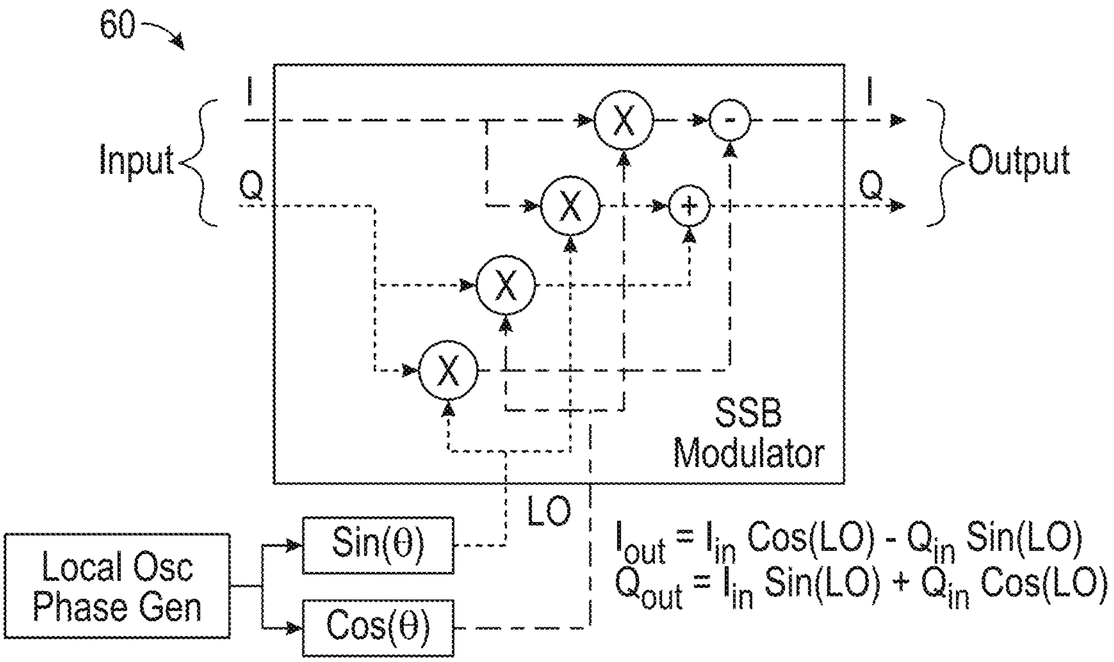
FIG. 10 is a schematic diagram of a single-sideband (SSB) modulator.

FIG. 10 shows the internal structure of a SSB Modulator functional block 60 used for each signal. I- and Q-components of a local-oscillator signal are multiplied with the I and Q components of the input signal, and results are combined to produce I- and Q-output signals representing the input signal modulated into a spectral position according to the local oscillator frequency.

Figure 11:
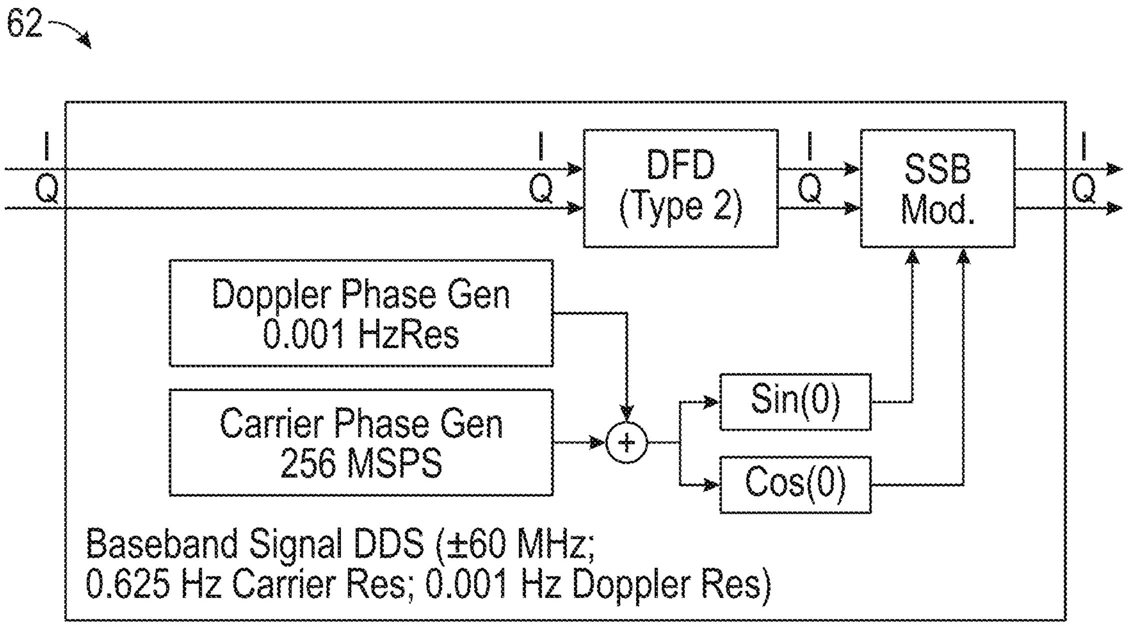
FIG. 11 is a schematic diagram of a direct-digital synthesizer.
Figure 12A:
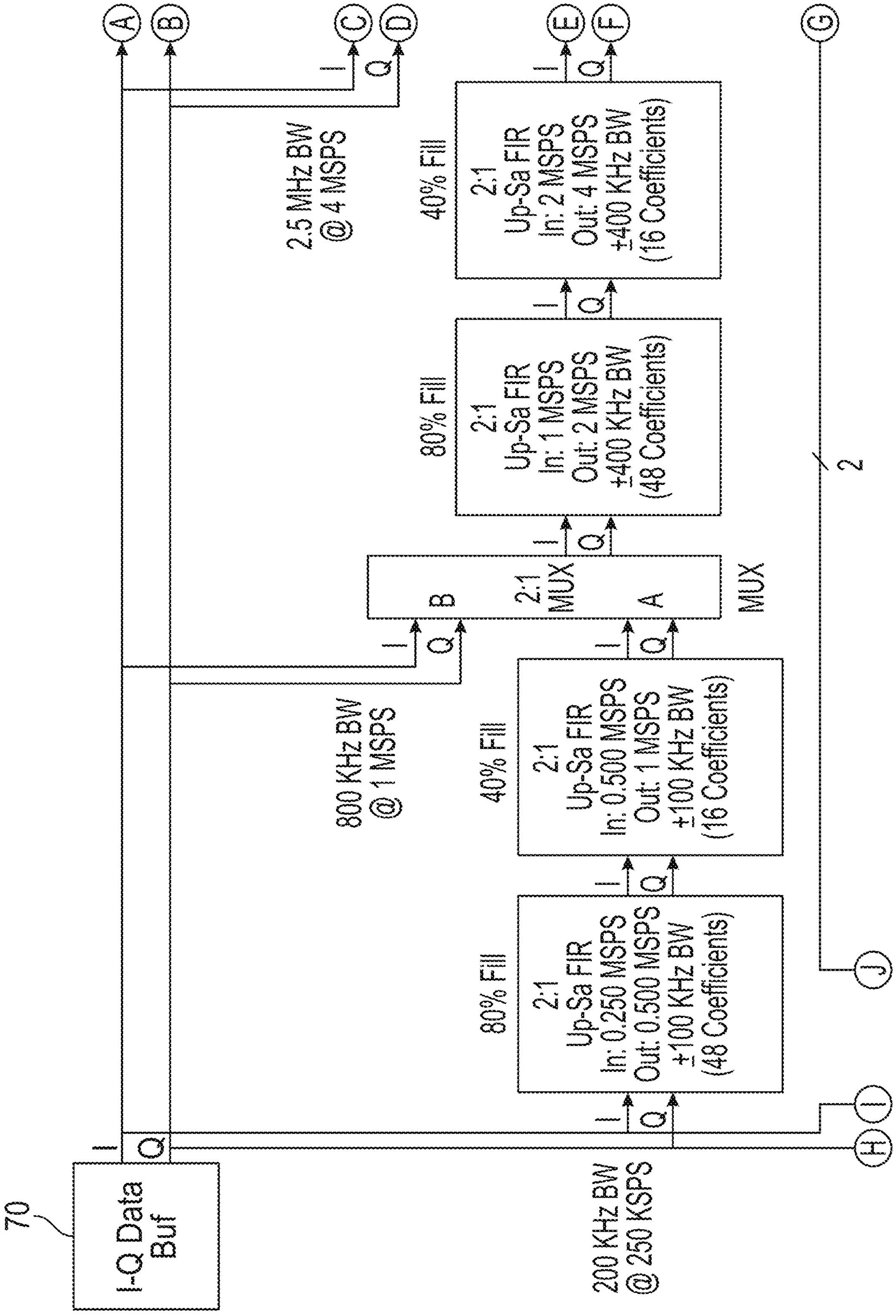
FIGS. 12-14 (consisting of FIGS. 12A-12D, 13A-13D, and 14A-14D respectively) are schematic diagrams of respective selection and up-sample filtering chains for wideband, medium-band, and narrowband signal channels.
Figure 12B:
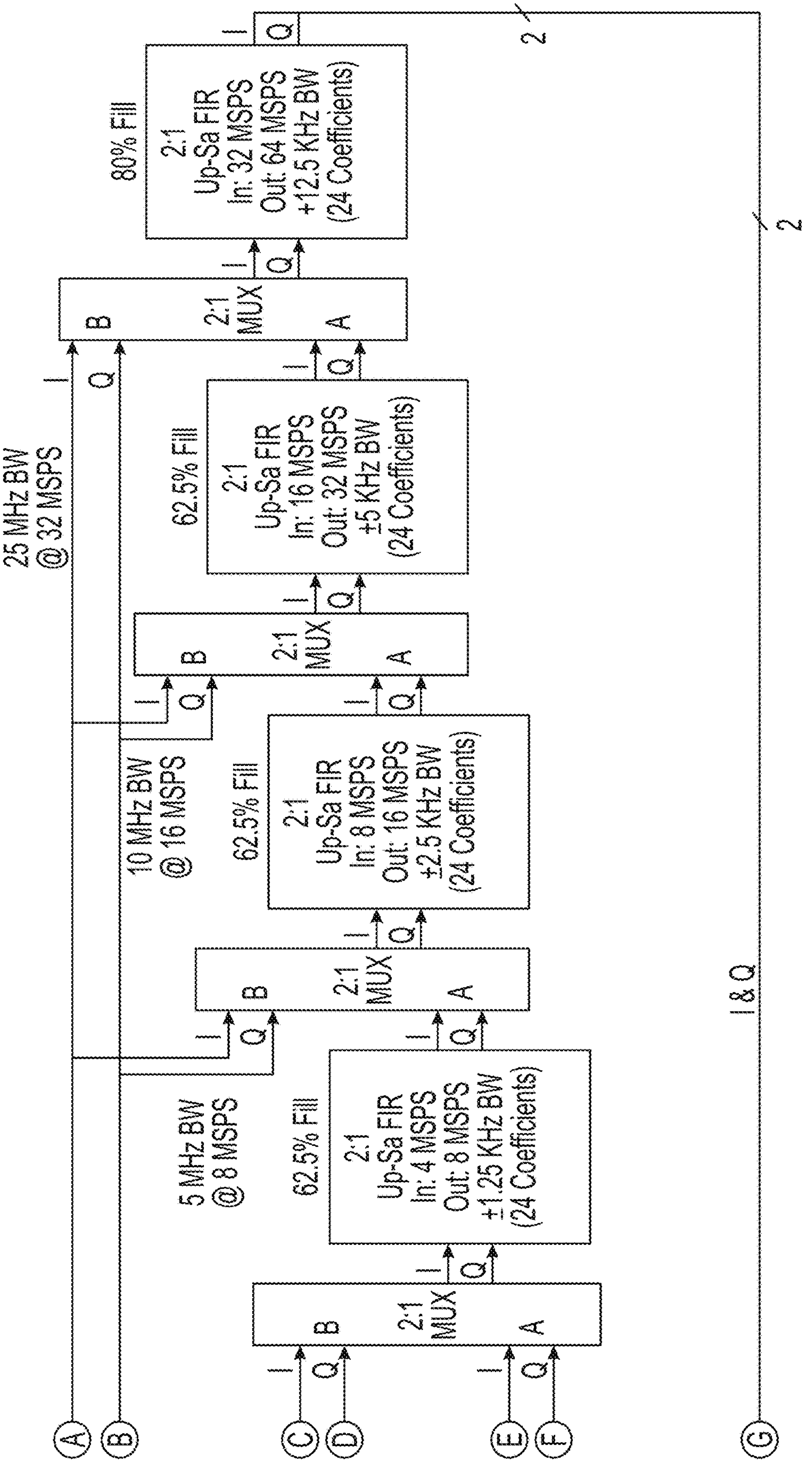
Figure 12C:
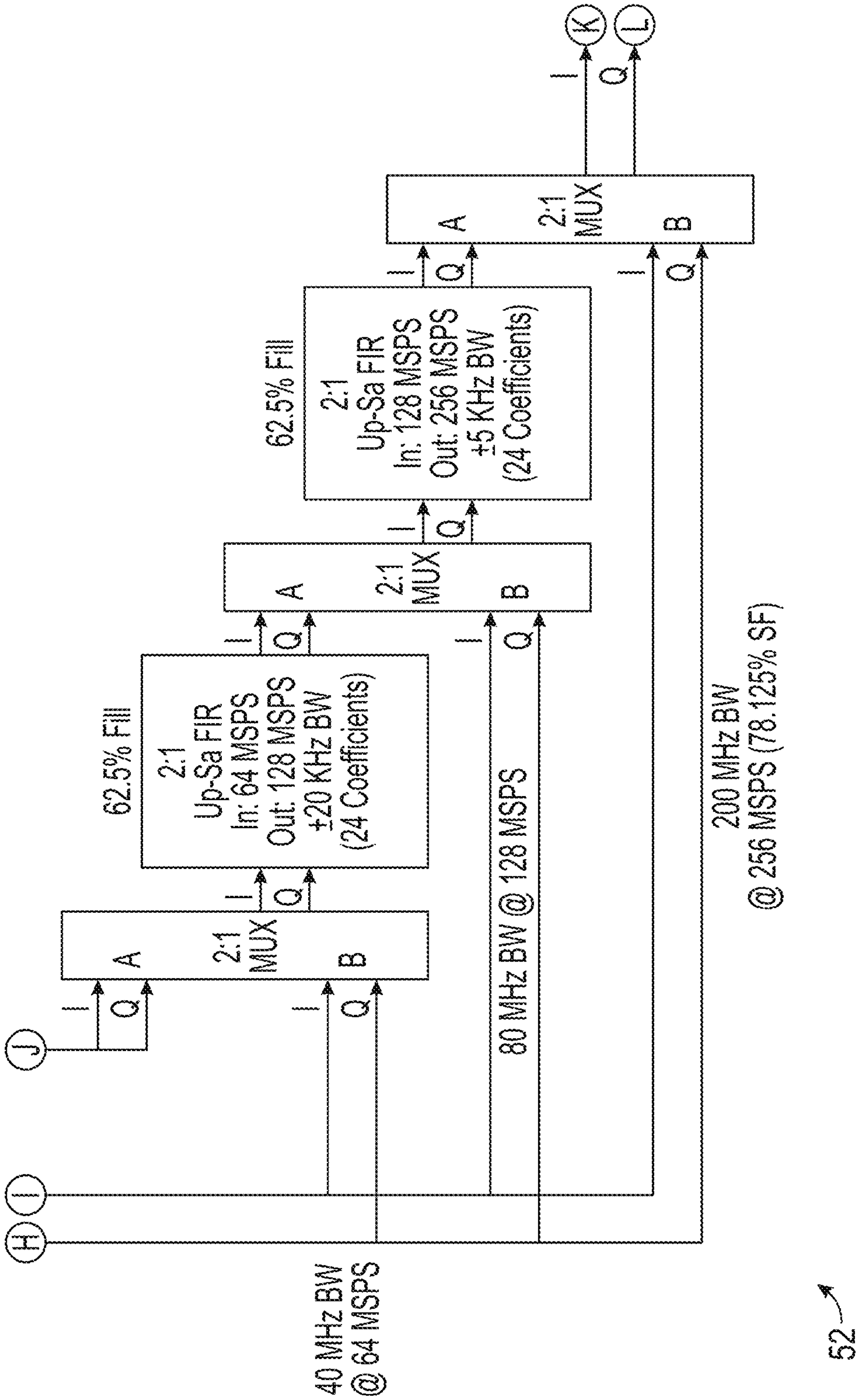
Figure 12D:
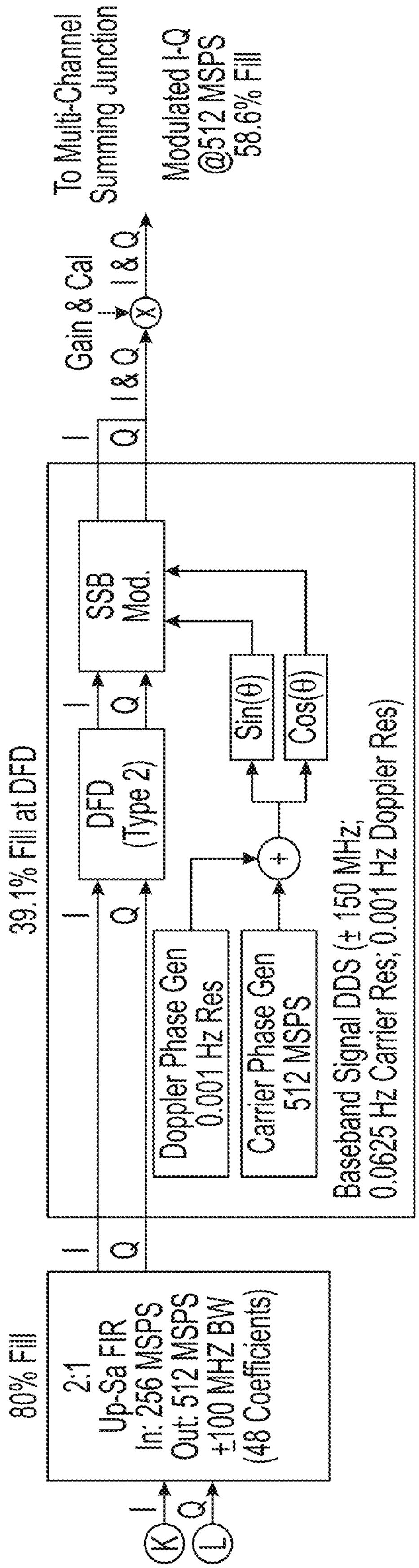
Figure 13A:
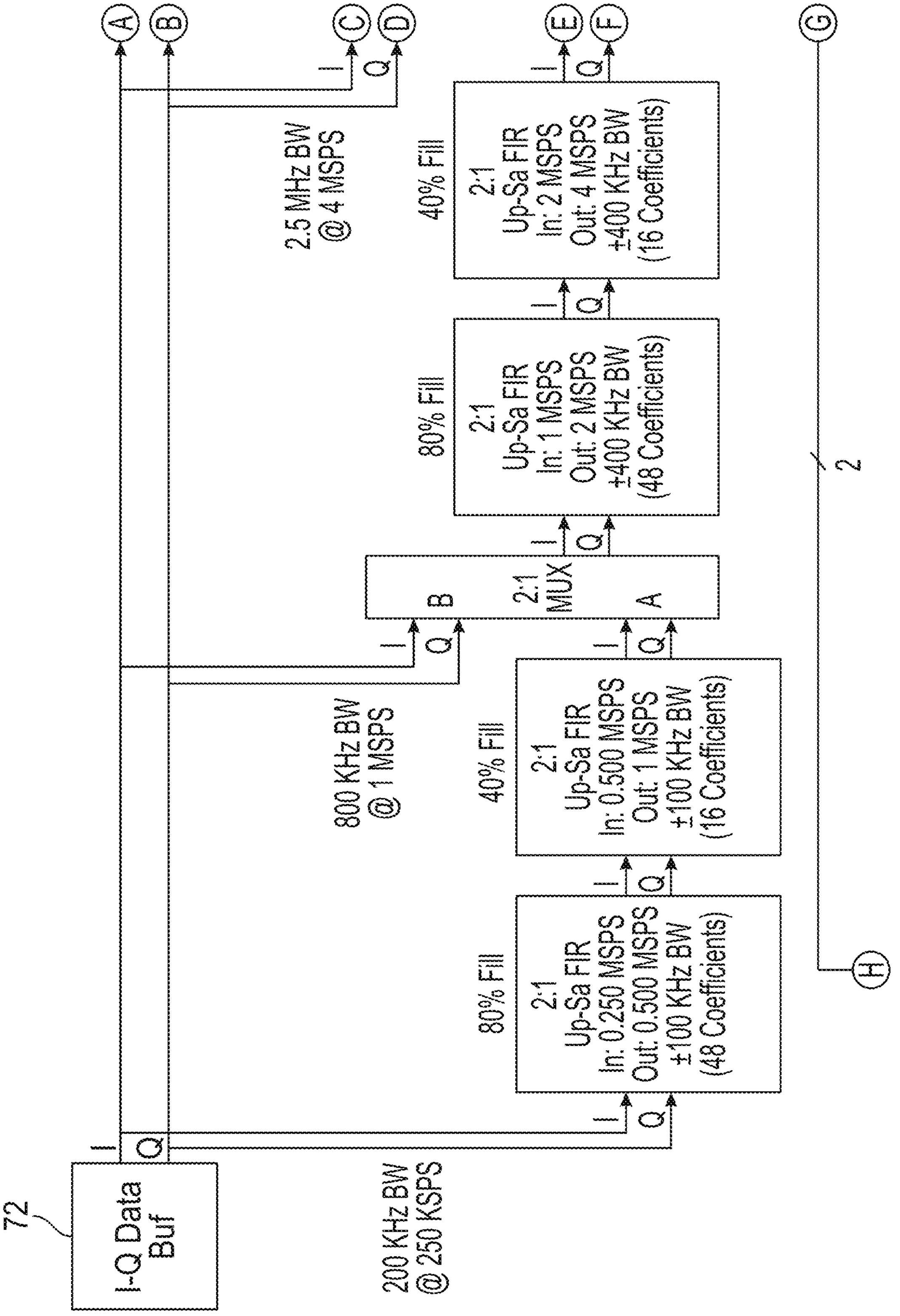
Figure 13B:
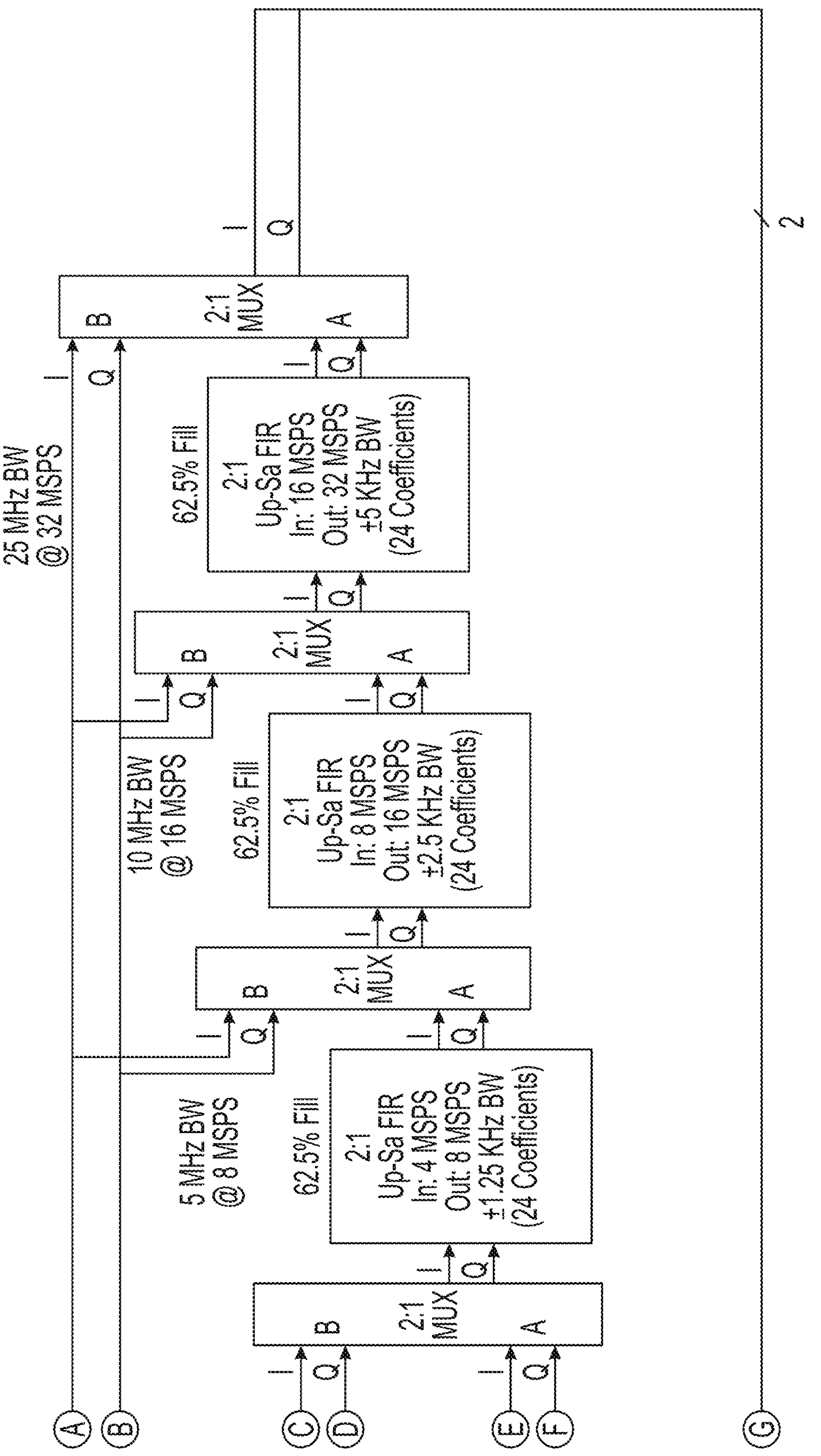
Figure 13C:
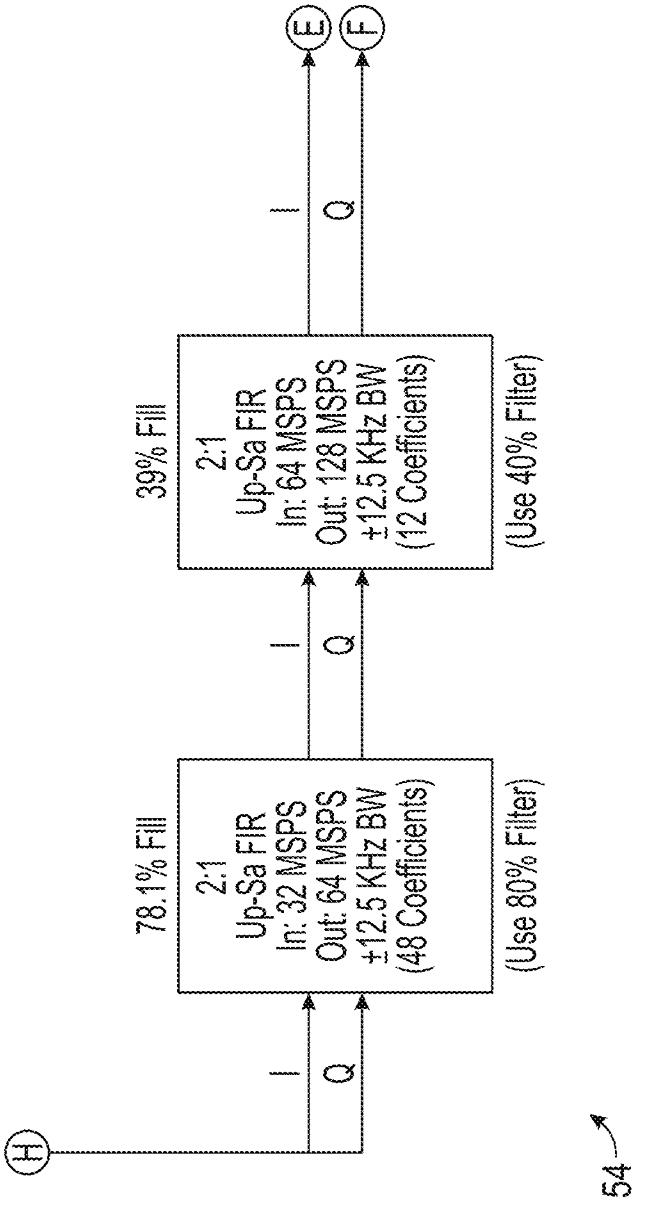
Figure 13D:
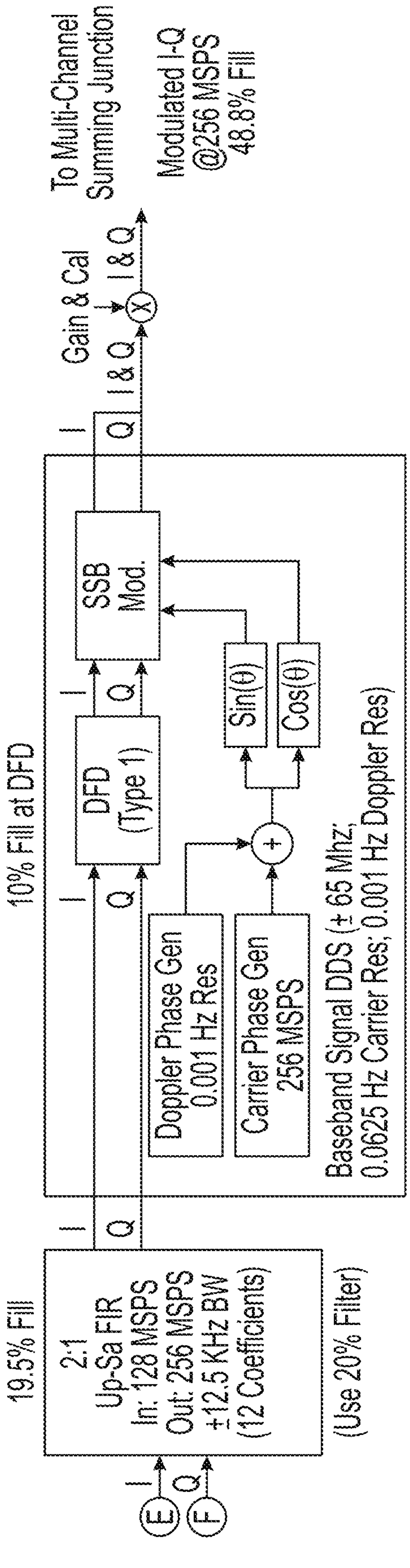
Figure 14A:
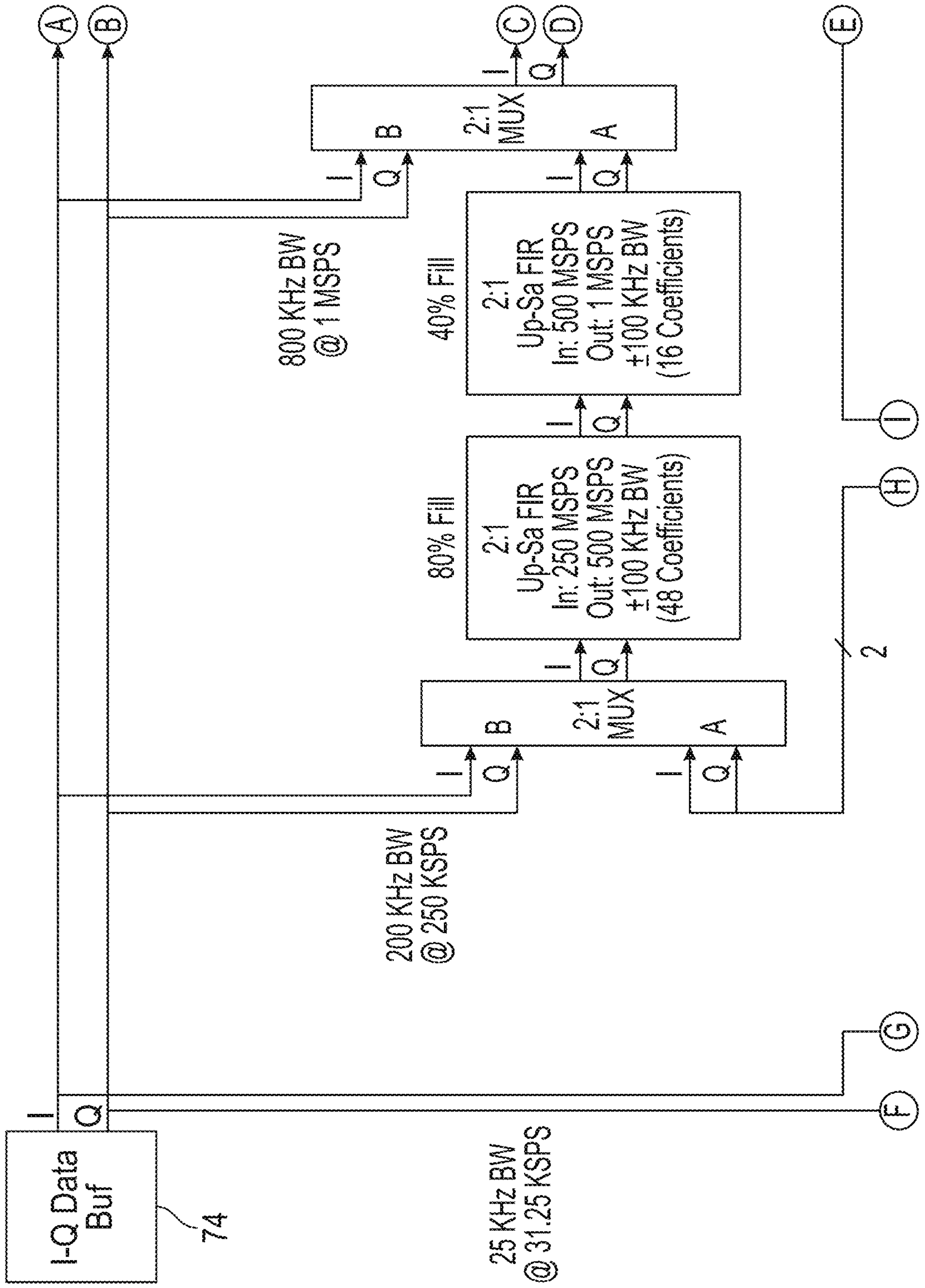
Figure 14B:
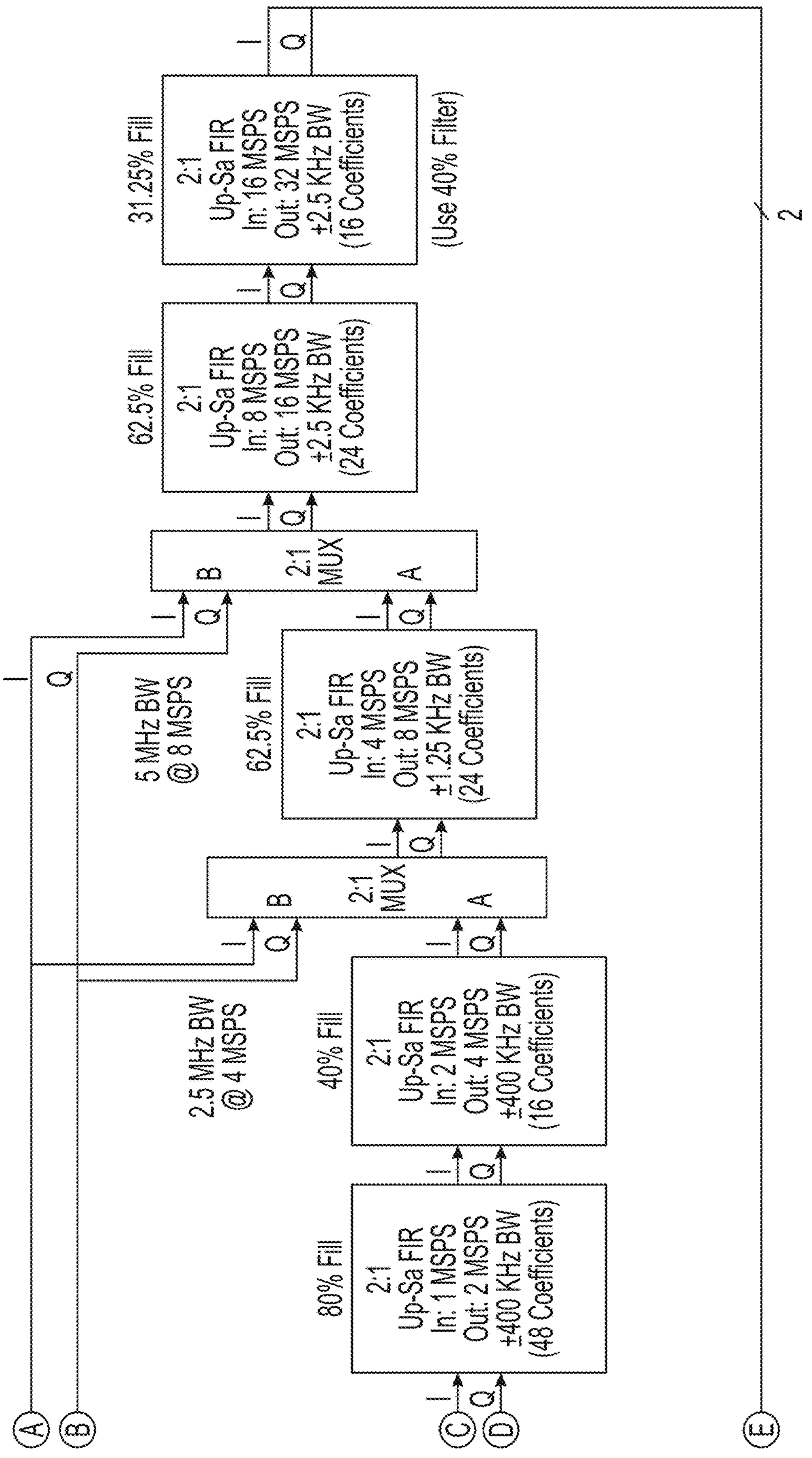
Figure 14C:
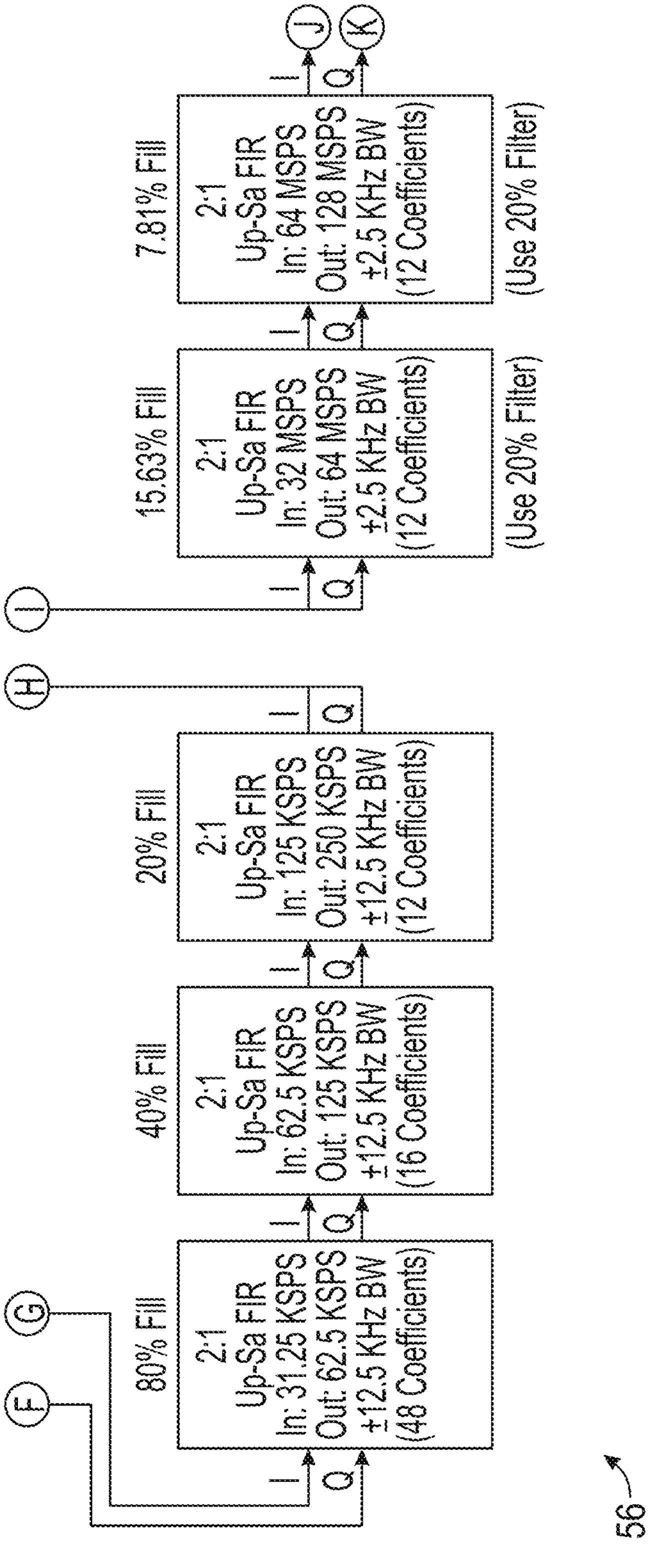
Figure 14D:
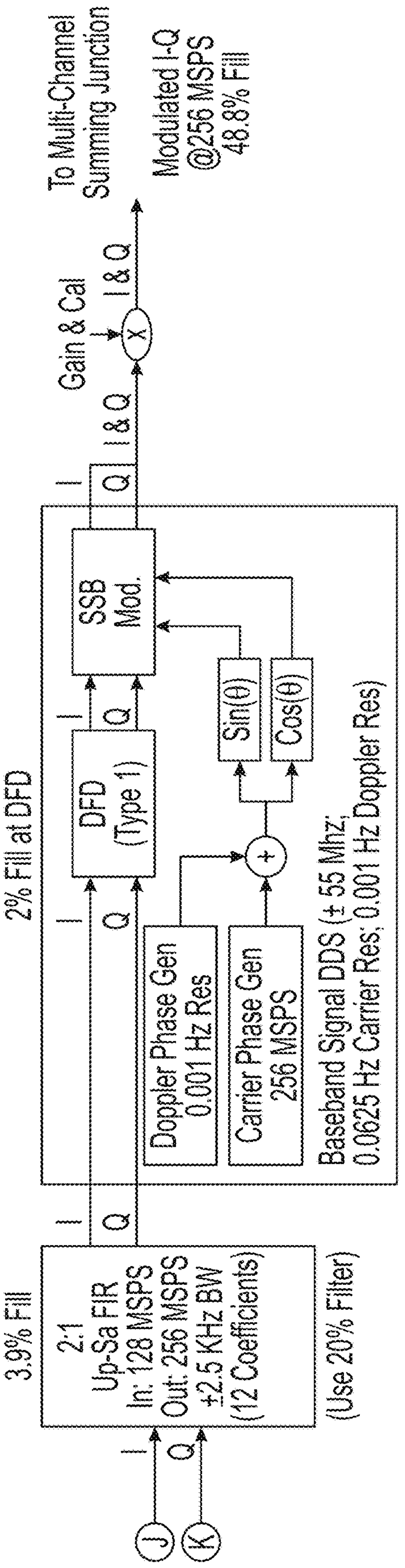

FIG. 11 shows an example of per-channel processing employing a direct digital synthesizer (DDS) 62 which includes a Digital Fine Delay function DFD along with the SSB modulation per FIG. 10. In many cases, the ability to apply fine-grained delay (much finer than sample interval) in sample-data space is crucial to providing high resolution temporal control (i.e., time difference of arrival (TDOA) effects) for individual signals. Individual control can only be applied prior to combining the I-Q data streams from multiple emitters. In other words, the control must be applied at the level of the baseband signal DDS 62 as in FIG. 11.

In one use, a Digital Fine Delay (DFD) function is tasked with advancing or delaying the digital I-Q data to account for the change in slant range that may accumulate (±) over time. The streaming I-Q data is queued and transmitted to the DESIQ receiver on an as-required basis. There is a FIFO in the DFD that buffers the data to allow for the fact that movement can slightly alter the effective clock rate of the data. The purpose of the DFD Function is to provide "fine-grain" temporal control of individual signals in sampled-data space. In one example, "fine-grain" means at least 1000 times finer than the signal sampled data rate (i.e., resolution ≤0.001 T, where T is the Sample Period). In this case, T≤3.9 ns, so the achievable temporal resolution is less than 10 ps.

Sample Data Rate Up-Sampling

In digital signal processing, sampled data may be up-sampled by inserting an integer number of zeroes between samples in the lower-rate signal, then filtering with a digital low pass filter. For example, a 2× up-sample process inserts one (1) zero between input samples, then filters the zero-packed data stream to produce the correct value for each sample at the higher sample data rate. The filter characteristics must be carefully chosen to pass the desired frequency content, but to reject the undesired spectral images produced by inserting zeros into the data stream. A discussion of the design of the filters in the receiver emulator 28, according to one example, is given below.

There are various considerations regarding up-sampling and filters. First, 2× up-sample filters are more efficient than higher-order up-sample filters. This is because the transition from passband to stopband gets progressively sharper for higher orders, which requires more filter coefficients. So, for example, to up-sample by 16:1, it is far more efficient to implement this as four (4) concatenated 2:1 stages than as a single 16:1 stage.

Next, the up-sample filters in the receiver emulator 28 are preferably designed to compensate for the up-sampling loss, to maintain zero dB net gain through the process. Inserting zeros in the data stream reduces the average signal strength by the up-sampling ratio (i.e., a 2× up-sample reduces average signal strength to half; a 4× up-sample to 0.25, etc.). This is compensated by designing the filter to have compensating gain (e.g., all 2× filters are designed to have a gain of 2, to offset signal loss that would otherwise result).

Finally, all digital low-pass filters are re-entrant at ±fs. In other words, the passband has images at ±2 on the normalized frequency scale. This implies it is impossible to remove the undesired images. These images can only be filtered after up-sampling, and only in the range of (−1) to (+1). At any sampling frequency, there will always be an image at ±2. These images are ultimately removed by analog filters after the digital-analog converter (DAC).

As noted above, in some embodiments the DESIQ capability requires many digital receiver emulations 28. In one embodiment, four (4) independent digital receiver emulations can be realized within the resource constraints of a single high-end FPGA or GPU card. The description herein is for a single receiver emulator. Typically, each of the multiple receiver emulations in the system is identical.

Because the intent is to scale to large numbers of channels, there is a need to consider computational efficiency in the channel configuration. Most communication signals are narrowband, with a relative few that require wider bandwidth. Since narrowband channels can be implemented more efficiently than wideband channels, it is prudent to implement many more narrowband channels than midband and wideband channels.

Thus in one embodiment as described more below, each DESIQ receiver emulator 28 has 128 channels, four of which are wideband capable (can support signal bandwidth up to 200 MHz), six of which are medium-band capable (support signal bandwidth up to 25 MHz), an a remaining number (e.g., 118, of 128 total) are narrowband capable (can support signal bandwidth up to 5 MHz). Each baseband channel processes s respective I-Q sampled-data stream up to the point at which it is first modulated onto a carrier, prior to the digital combination with any other signal.

Wide-Bandwidth Channels 1-4

FIG. 12 illustrates the Digital Signal Processing (DSP) structure of an illustrative one of the four Wideband Channels (Channels 1 through 4) in one embodiment (one of the WB blocks 52 of FIG. 3). These channels may be configured to any of the signal bandwidths and I-Q Data rates listed in Table 2 below. Basic blocks in this as well as FIGS. 13 and 14 include 2:1 multiplexers (2:1 MUX) and up-sampling filters (Up-Sa FIR), the latter having varying specific characteristics (sample rate, # of coefficients) as summarized within each block.

TABLE 2

Options for Wide-BW Channels 1-4

| Option | I-Q Data Rate |
|---|---|
| 200 KHz | 250 KSPS |
| 800 KHz | 1 MSPS |
| 2.5 MHz | 4 MSPS |
| 5 MHz | 8 MSPS |
| 10 MHz | 16 MSPS |
| 25 MHz | 32 MSPS |
| 40 MHz | 64 MSPS |
| 80 MHz | 128 MSPS |
| 200 MHz | 256 MSPS |

Referring to FIG. 12, I-Q Data is received from an Ethernet I-Q Data Buffer 70 at any one of the allowable I-Q Sampled Data Rates and is routed through the signal processing structure, using appropriate settings of the various 2:1 multiplexers (2:1 MUX) in accordance with the input Sampled Data Rate. For example, if the signal has 200 MHz bandwidth, the last 2:1 multiplexer (just before DDS) is set to select its B input, whereas for any other bandwidth this multiplexer is set to select its A input to receive the output from the preceding multiplexer. This selection scheme is repeated for upstream multiplexers as needed. Thus, if the channel signal has the lowest permissible bandwidth of 200 KHz, it traverses through the A inputs of the entire string of 2:1 multiplexers. No matter what the input Sampled Data Rate, the I-Q data stream is progressively up-sampled until it reaches 512 MSPS (4× the Digital receiver Sample Rate of 128 MSPS). Per the discussion above, the higher sample rate is required to provide enough spectral separation to allow wide-bandwidth signals to be placed adjacent to the receiver passband.

In this example there are eleven (11) 2:1 up-sample filters (Up-Sa FIR) utilized, selected from three different types (spectral fill values of 80%, 40%, and 62.5%, being signal full bandwidth divided by the input sample rate). For example, the 200 MHz maximum signal bandwidth is sampled at 256 MSPS, which is why the last 2:1 up-sample filter allows for 80% spectral fill (200/256=0.78125). Following the 2:1 up-sample to 512 MSPS the same 200 MHz has been reduced to 39.1% at the DFD because the sample rate is higher while the bandwidth has remained at 200 MHz.

In the structure of FIG. 12, the baseband signal DDS (at lower right) is tunable over a minimum of ±150 MHz with 1/16 th Hz base resolution and 0.001 Hz Doppler Resolution. This range allows a signal with 200 MHz (i.e., ±100 MHz about the carrier) to be placed such that it is adjacent to (i.e., just out of band) with a receiver passband of ±50 MHz).

Mid-Bandwidth Channels 5-10

FIG. 13 illustrates the Digital Signal Processing (DSP) structure of an illustrative one of the six Midband Channels (Channels 5 through 10) in one embodiment (one of the MB blocks 54 of FIG. 3). These channels may be configured to any of the signal bandwidths and I-Q Data rates listed in Table 3 below.

TABLE 3

Options for Mid-BW Channels

| BW Option | I-Q Data Rate |
|---|---|
| 200 KHz | 250 KSPS |
| 800 KHz | 1 MSPS |
| 2.5 MHz | 4 MSPS |
| 5 MHz | 8 MSPS |
| 10 MHz | 16 MSPS |
| 25 MHz | 32 MSPS |

I-Q Data is received from an Ethernet I-Q Data Buffer 72 at any one of the allowable I-Q Sampled Data Rates above and is routed through the signal processing structure, using appropriate settings of the various 2:1 multiplexers (2:1 MUX) in accordance with the input Sampled Data Rate. No matter what the input Sampled Data Rate, the I-Q data stream is progressively up-sampled until it reaches 256 MSPS (2× the Digital receiver Sample Rate of 128 MSPS). Per the discussion above, the higher sample rate is required to provide enough spectral separation to allow mid-bandwidth signals to be placed adjacent to the receiver passband.

In the illustrated embodiment, there are ten (10) 2:1 up-sample filters required, of four different types (spectral fill values of 80%, 40%, 62.5%, and 20%). The max BW of 25 MHz has been reduced to 10% at the DFD because the sample rate at that point has increased to 256 MSPS. The Baseband Signal DDS (at lower right) is tunable over a minimum of ±65 MHz with 1/16 th Hz base resolution and 0.001 Hz Doppler Resolution. This range allows a signal with 25 MHz (i.e., ±12.5 MHz about the carrier) to be placed such that it is adjacent to (i.e., just out of band) with a receiver passband of ±50 MHz).

Narrow-Bandwidth Channels 11-128

FIG. 14 illustrates the Digital Signal Processing (DSP) structure of the one hundred eighteen (118) Narrow-Bandwidth Channels (Channels 11 through 128) in one embodiment (one of the NB blocks 56 of FIG. 3). These channels may be configured to any of the signal bandwidths and I-Q Data rates listed in Table 4 below.

TABLE 4

Options for Narrow-BW Channels

| BW Option | I-Q Data Rate |
|---|---|
| 25 KHz | 31.25 KSPS |
| 200 KHz | 250 KSPS |
| 800 KHz | 1 MSPS |

TABLE 4-continued

| Options for Narrow-BW Channels | |
|---|---|
| BW Option | I-Q Data Rate |
| 2.5 MHz | 4 MSPS |
| 5 MHz | 8 MSPS |

I-Q Data is received from an Ethernet I-Q Data Buffer 74 at any one of the allowable I-Q Sampled Data Rates above and is routed through the signal processing structure, using appropriate settings of the various 2:1 multiplexers (2:1 MUX) in accordance with the input Sampled Data Rate. No matter what the input Sampled Data Rate, the I-Q data stream is progressively up-sampled until it reaches 256 MSPS (2× the Digital receiver Sample Rate of 128 MSPS). Per the discussion above, the higher sample rate is required to provide enough spectral separation to allow Narrow-Bandwidth signals to be placed adjacent to the receiver passband.

There are thirteen (13) 2:1 up-sample filters, of four different types (spectral fill values of 80%, 40%, 62.5%, and 20%). The maximum BW of 5 MHz has been reduced to 2% at the DFD because the sample rate at that point has increased to 256 MSPS.

The Baseband Signal DDS (at lower right) is tunable over a minimum of ±55 MHz with 1/16 th Hz base resolution and 0.001 Hz Doppler Resolution. This range allows a signal with 5 MHz (i.e., ±2.5 MHz about the carrier) to be placed such that it is adjacent to (i.e., just out of band) with a receiver passband of ±50 MHz).

Channel Combining 58

Figure 15:
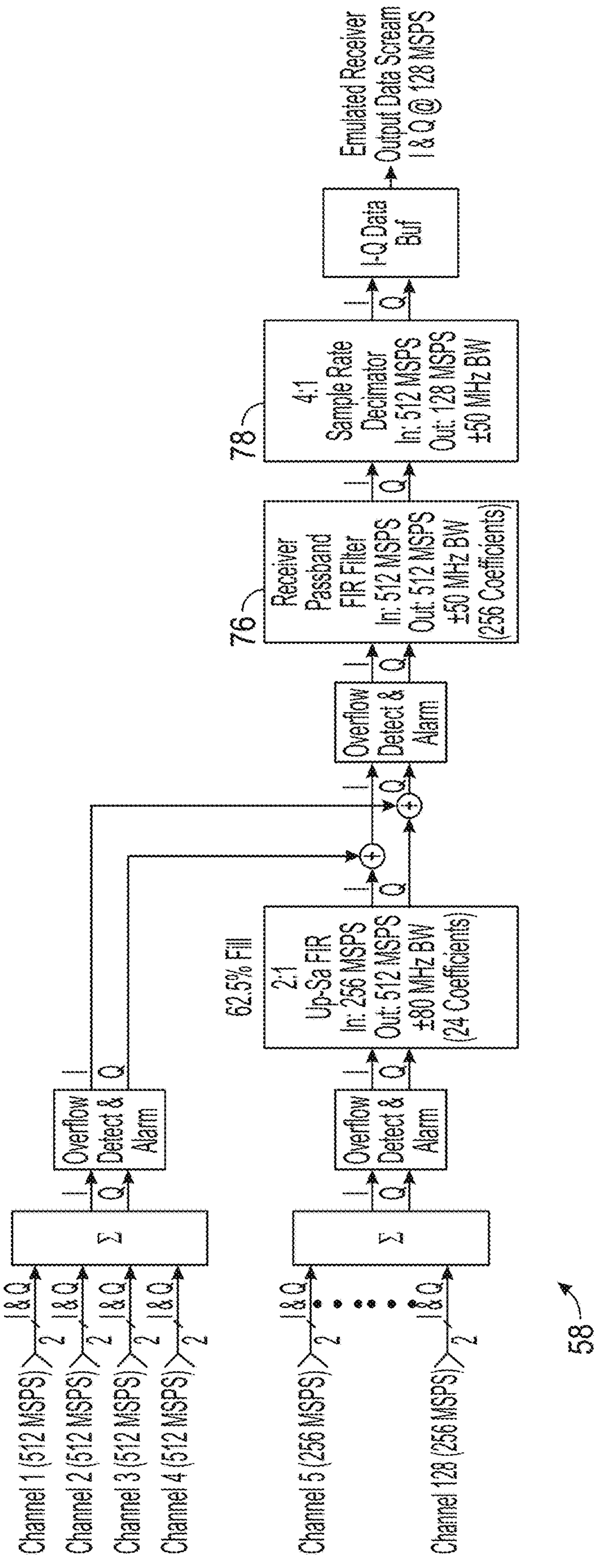
FIG. 15 is a schematic diagram of circuitry for final channel combining, bandpass filtering, and down-sampling to generate a baseband composite I-Q data signal.

FIG. 15 illustrates the signal processing structure for the channel combining block 58 of FIG. 3, which receives as input the various channel signals from respective instances of the structures of FIGS. 12-14. Channels 1 through 4 are running at a sampled data rate of 512 MSPS, while Channels 5 through 128 are running at a sampled data rate of 256 MSPS. Thus, the two sample rate groups are first combined separately at blocks Σ, summing together all the channels at each sample rate. An “Overflow Detect and Alarm” function may be used to detect potential mathematical overflow if needed, i.e., to ensure that the various summations do not overflow the fixed-point math (e.g. 16-bit) used in the emulated receiver, and to notify the operator of an error condition if such overflow is detected.

To obtain a common sampled data rate, the combined channels 5-128 clocking at 256 MSPS are up-sampled 2:1 to 512 MSPS. The spectral fill of these channels is set by the Mid-bandwidth channels (Channels 5 through 10), which have an allowable bandwidth of ±80 MHz. Thus, the up-sample filter is based on 62.5% spectral fill (160/256). The two signal groups are then combined at the 512 MSPS sampled data rate (and again checked for potential overflow) . The output of this process is a single data stream, at 512 MSPS, being a baseband signal that contains the I-Q data from all 128 emitter signal channels.

The receiver measurement response is emulated by a receiver passband FIR filter 76 (±50 MHz nominal passband, 512 MSPS, 256 coefficients), prior to 4:1 decimation (down-sampling) by decimator 78 to the emulated receiver sample data rate of 128 MSPS. In this example, the 256 filter coefficients are an initial allocation based on assumptions for the receiver. Ideally, the exact receiver bandpass filter characteristics will be known, and the coefficients of this filter selected to exactly mimic the receiver measurement response. While an allocation of 256 coefficients may seem like an unusually large number, it is necessary to replicate the temporal span of the filters in the receiver (Bandwidth resolution is set by temporal span), which is clocking at a 4× lower sample rate (i.e., 256 samples @ 512 MSPS have the same temporal span as 64 samples @ 128 MSPS). This assumes that the receiver implements filters longer than 64 taps.

The overall output signal, corresponding to Output I-Q in FIG. 2, is an I-Q representation of a baseband signal at the nominal receiver sample rate, e.g., 128 MSPS. Spectrally, it contains not only those signals in the receiver passband, but also partially filtered portions of band-adjacent signals that will have been affected by the transition (roll-off) characteristic of the receiver passband filter. This provides for the desired accurate handling of band-adjacent signals that can occur in real operating environments, including the effect of the receiver passband characteristic, as described above.

Up-Sampling Filter Design

The processing structures detailed in FIGS. 12-15 use four (4) types of 2:1 up-sample filters, based on allowable spectral fill (80%, 62.5%, 40%, and 20%). In general, as the allowable spectral fill drops, the filter needs fewer coefficients because the separation between the filter passband and reject band increases.

Table 5 below lists the Pass and Reject bands for each level of spectral fill. These specifications are on a Normalized Frequency Scale in which the Nyquist frequency is 1 (Clock Rate=2). For example, at 80% spectral fill, prior to up-sampling, the signal upper edge=0.8 (80%) and the lower edge of the image=1.2 (i.e., 2-0.8). After up-sampling, the limits scale by the up-sample ratio (in this case, 2:1). Thus, the signal upper edge at 0.8 becomes a passband of 0.4; and the image lower edge at 1.2 becomes a stopband of 0.6.

TABLE 5

Up-Sample Filter Pass/Reject Limits Vs. Spectral Fill

| | Pre-Upsample | | Post-Upsample | |
|---|---|---|---|---|
| Spectral fill % | Signal Upper Edge | Image Lower Edge | Pass | Reject |
| 80 | 0.8 | 1.2 | 0.4 | 0.6 |
| 62.5 | 0.625 | 1.375 | 0.3125 | 0.6875 |
| 40 | 0.4 | 1.6 | 0.2 | 0.8 |
| 20 | 0.2 | 1.8 | 0.1 | 0.9 |

In one example, the filters may be realized as follows:

2:1 Up-sample Filter (80% spectral fill)

This may be a 48-Coefficient, 2:1 (Gain=2) up-sample filter for signals with ≤80% spectral fill. It is used in four places in each of the wideband channels, three places in each of the midband channels, and three places in each of the narrowband channels.

2:1 Up-sample Filter (62.5% spectral fill)

This may be a 24-Coefficient, 2:1 Up-sample filter for signals ≤62.5% spectral fill. The coefficients have a Gain of 2. It is used in five places in each of the wideband channels, three places in each of the midband channels, and two places in each of the narrowband channels.

2:1 Up-sample Filter (40% spectral fill)

This may be a 16-Coefficient, 2:1 Up-sample filter for signals ≤40% spectral fill. The coefficients have a Gain of 2. It is used in two places in each of the wideband channels, three places in each of the midband channels, and four places in each of the narrowband channels.

2:1 Up-sample Filter (20% spectral fill)

This may be a 12-Coefficient, 2:1 Up-sample filter for signals ≤20% spectral fill. The coefficients have a Gain of 2. It is used in one place in each of the midband channels, and four places in each of the narrowband channels.

Figure 16:
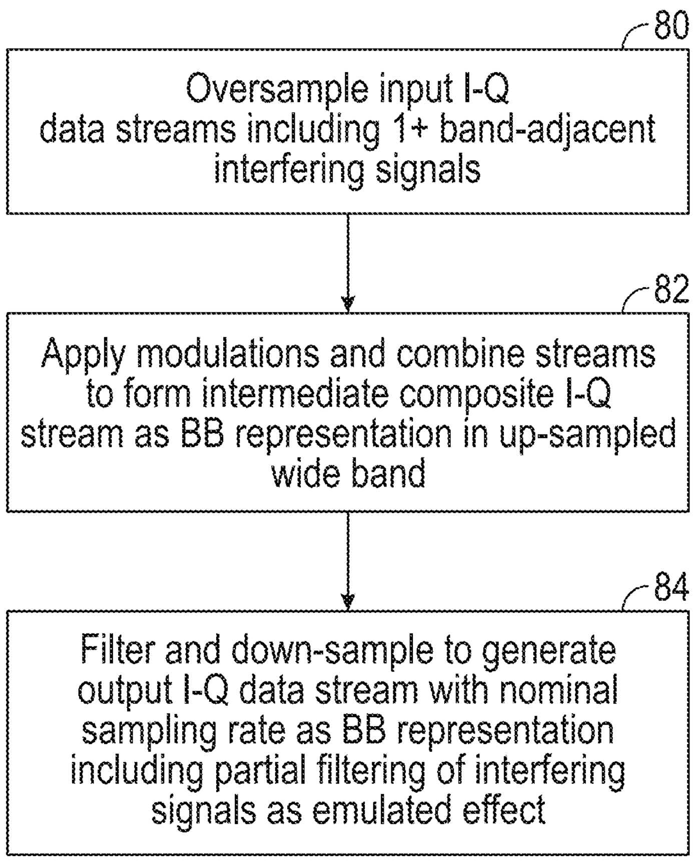
FIG. 16 is a simplified flow diagram of core processing functionality of the disclosed technique.

FIG. 16 is a simplified flow diagram of certain key operation with respect to digital receiver emulation as disclosed herein. This operation is in the context of operating a simulation system to emulate effects of a passband characteristic of a digital receiver in a simulated dense signal environment represented by a set of I-Q sampled data streams for respective simulated signals, wherein at least some of the simulated signals are interfering signals occupying a filter transition region adjacent to an edge of a receiver passband of the digital receiver, such as described above.

At 80, the I-Q sampled data streams are over-sampled at an over-sampled rate being a multiple two or more of a nominal Nyquist-based receiver sampling rate for the receiver passband. The sampled data streams include one or more (1+) signals being band-adjacent ("interfering") signals occupying a filter transition region adjacent to an edge of a receiver passband of the digital receiver, such as described above with reference to FIGS. 5 and 6 for example. The over-sampling produces respective over-sampled I-Q data streams for the simulated signals.

At 82, respective modulations are applied to the over-sampled I-Q data streams to produce respective modulated signals, and the modulated signals are combined to create an intermediate composite I-Q sampled data stream being a baseband representation of the simulated dense signal environment in an up-sampled band wider than the receiver passband according to the multiple of the over-sampling rate.

At 84, band-limiting filtering and down-sampling (decimation) are applied to the intermediate composite I-Q sampled data stream to generate an output I-Q sampled data stream. The output I-Q sampled data stream has a data rate equal to the nominal Nyquist-based receiver sampling rate, and it is a baseband representation of the simulated dense signal environment including partial filtering of the interfering signals as an emulated effect of the passband characteristic of the digital receiver.

The individual features of the various embodiments, examples, and implementations disclosed within this document can be combined in any desired manner that makes technological sense. Furthermore, the individual features are hereby combined in this manner to form all possible combinations, permutations, and variants except to the extent that such combinations, permutations, and/or variants have been explicitly excluded or are impractical. Support for such combinations, permutations and variants is considered to exist within this document.

While various embodiments of the invention have been particularly shown and described, it will be understood by those skilled in the art that various changes in form and details may be made therein without departing from the scope of the invention as defined by the appended claims.

What is claimed is:

1. A method of operating a simulation system to emulate effects of a passband characteristic of a digital receiver in a simulated dense signal environment represented by a set of I-Q sampled data streams for respective simulated signals, at least some of the simulated signals being band-adjacent signals occupying a filter transition region adjacent to an edge of a receiver passband of the digital receiver, comprising:

over-sampling the I-Q sampled data streams at an over-sampling rate being a multiple two or more of a nominal Nyquist-based receiver sampling rate for the receiver passband, the over-sampling producing respective over-sampled I-Q data streams for the simulated signals;

applying respective modulations to the over-sampled I-Q data streams to produce respective modulated signals, and combining the modulated signals to create an intermediate composite I-Q sampled data stream being a baseband representation of the simulated dense signal environment in an up-sampled band wider than the receiver passband according to the multiple of the over-sampling rate; and applying a band-limiting filter and down-sampling to the intermediate composite I-Q sampled data stream to generate an output I-Q sampled data stream, the output I-Q sampled data stream having a data rate equal to the nominal Nyquist-based receiver sampling rate and being a baseband representation of the simulated dense signal environment including partial filtering of the band-adjacent signals as an emulated effect of the passband characteristic of the digital receiver.

2. The method of claim 1, wherein the filter transition region extends between the passband edge and the nominal Nyquist-based receiver sampling rate, having a spectral width providing a predetermined spectral fill of less than 100%.

3. The method of claim 2, wherein the spectral fill is in a range below 100% and above about 75%.

4. The method of claim 1, wherein the over-sampling rate is a first over-sampling rate being a multiple of four or more of the nominal Nyquist-based receiver sampling rate, and wherein the over-sampling of the I-Q sampled data streams includes:

first over-sampling of a first subset of the I-Q sampled data streams at the over-sampling rate to create first over-sampled data streams;

second over-sampling of a second subset of the I-Q sampled data streams at a second over-sampling rate being a sub-multiple of the over-sampling rate, to create second over-sampled data streams; and third oversampling of the second over-sampled data streams at the over-sampling rate to create third over-sampled data streams, and combining the first and third over-sampled data streams to create the over-sampled I-Q data streams.

5. The method of claim 4, wherein the first over-sampling rate is four times the nominal Nyquist-based receiver sampling rate, and the second over-sampling rate is two times the nominal Nyquist-based receiver sampling rate.

6. The method of claim 4, wherein the first subset of the I-Q sampled data streams represents corresponding wideband signals having respective bandwidths greater than the receiver passband, such that respective portions of the wideband signals form first ones of the band-adjacent signals, and wherein the second subset of the I-Q sampled data streams represents corresponding lower-bandwidth signals having respective bandwidths less than the receiver passband but located in the filter transition region to form second ones of the band-adjacent signals.

7. The method of claim 6, wherein the lower-bandwidth signals include narrowband signals of a first bandwidth substantially narrower than the receiver passband, and medium-band signals of a second bandwidth a multiple of the first bandwidth.

8. The method of claim 7, wherein the modulated signals include three modulated signals formed from the respective I-Q data streams for the narrowband, medium-band, and wideband signals, respectively.

9. The method of claim 7, wherein there are substantially more of the narrowband signals than the wideband and medium-band signals.

10. The method of claim 9, wherein:

the wideband signals have respective bandwidths selected from a first set of bandwidths greater than a lowest wide bandwidth;

the medium-band signals have respective bandwidths selected from a second set of bandwidths partially overlapping the first set of bandwidths; and the narrowband signals have respective bandwidths selected from a third set of bandwidths partially overlapping the second set of bandwidths.

11. A computer program product including a non-transitory computer-readable medium storing computer program instructions which, when executed by a computerized device, cause the computerized device to operate as part of a simulation system to emulate effects of a passband characteristic of a digital receiver in a simulated dense signal environment represented by a set of I-Q sampled data streams for respective simulated signals, at least some of the simulated signals being band-adjacent signals occupying a filter transition region adjacent to an edge of a receiver passband of the digital receiver, the operation including:

over-sampling the I-Q sampled data streams at an over-sampling rate being a multiple two or more of a nominal Nyquist-based receiver sampling rate for the receiver passband, the over-sampling producing respective over-sampled I-Q data streams for the simulated signals;

applying respective modulations to the over-sampled I-Q data streams to produce respective modulated signals, and combining the modulated signals to create an intermediate composite I-Q sampled data stream being a baseband representation of the simulated dense signal environment in an up-sampled band wider than the receiver passband according to the multiple of the over-sampling rate; and applying a band-limiting filter and down-sampling to the intermediate composite I-Q sampled data stream to generate an output I-Q sampled data stream, the output I-Q sampled data stream having a data rate equal to the nominal Nyquist-based receiver sampling rate and being a baseband representation of the simulated dense signal environment including partial filtering of the band-adjacent signals as an emulated effect of the passband characteristic of the digital receiver.

12. The computer program product of claim 11, wherein the filter transition region extends between the passband edge and the nominal Nyquist-based receiver sampling rate, having a spectral width providing a predetermined spectral fill of less than 100%.

13. The computer program product of claim 12, wherein the spectral fill is in a range below 100% and above about 75%.

14. The computer program product of claim 11, wherein the over-sampling rate is a first over-sampling rate being a multiple of four or more of the nominal Nyquist-based receiver sampling rate, and wherein the over-sampling of the I-Q sampled data streams includes:

first over-sampling of a first subset of the I-Q sampled data streams at the over-sampling rate to create first over-sampled data streams;

second over-sampling of a second subset of the I-Q sampled data streams at a second over-sampling rate being a sub-multiple of the over-sampling rate, to create second over-sampled data streams; and third oversampling of the second over-sampled data streams at the over-sampling rate to create third over-sampled data streams, and combining the first and third over-sampled data streams to create the over-sampled I-Q data streams.

15. The computer program product of claim 14, wherein the first over-sampling rate is four times the nominal Nyquist-based receiver sampling rate, and the second over-sampling rate is two times the nominal Nyquist-based receiver sampling rate.

16. The computer program product of claim 14, wherein the first subset of the I-Q sampled data streams represents corresponding wideband signals having respective bandwidths greater than the receiver passband, such that respective portions of the wideband signals form first ones of the band-adjacent signals, and wherein the second subset of the I-Q sampled data streams represents corresponding lower-bandwidth signals having respective bandwidths less than the receiver passband but located in the filter transition region to form second ones of the band-adjacent signals.

17. The computer program product of claim 16, wherein the lower-bandwidth signals include narrowband signals of a first bandwidth substantially narrower than the receiver passband, and medium-band signals of a second bandwidth a multiple of the first bandwidth.

18. The computer program product of claim 17, wherein the modulated signals include three modulated signals formed from the respective I-Q data streams for the narrowband, medium-band, and wideband signals, respectively.

19. The computer program product of claim 17, wherein there are substantially more of the narrowband signals than the wideband and medium-band signals.

20. The computer program product of claim 19, wherein:

the wideband signals have respective bandwidths selected from a first set of bandwidths greater than a lowest wide bandwidth;

the medium-band signals have respective bandwidths selected from a second set of bandwidths partially overlapping the first set of bandwidths; and the narrowband signals have respective bandwidths selected from a third set of bandwidths partially overlapping the second set of bandwidths.

* * * * *